(12) United States Patent
Jin et al.

(10) Patent No.: US 11,362,867 B2
(45) Date of Patent: Jun. 14, 2022

(54) SYSTEMS, METHODS AND APPARATUS FOR TRANSMISSION OF DATA USING M-ARY TIME REVERSAL PULSE POSITION MODULATION

(71) Applicant: University of Maryland Eastern Shore, Princess Anne, MD (US)

(72) Inventors: Yuanwei Jin, Salisbury, MD (US); Tonmo Vanessa Carine Fepeussi, Princess Anne, MD (US)

(73) Assignee: University of Maryland Eastern Shore, Princess Anne, MD (US)

( * ) Notice: Subject to any disclaimer, the term of this patent is extended or adjusted under 35 U.S.C. 154(b) by 0 days.

(21) Appl. No.: 17/047,885

(22) PCT Filed: Apr. 3, 2019

(86) PCT No.: PCT/US2019/025510
§ 371 (c)(1),
(2) Date: Oct. 15, 2020

(87) PCT Pub. No.: WO2019/204033
PCT Pub. Date: Oct. 24, 2019

(65) Prior Publication Data
US 2021/0111929 A1 Apr. 15, 2021

Related U.S. Application Data

(60) Provisional application No. 62/659,123, filed on Apr. 17, 2018.

(51) Int. Cl.
*H04L 25/02* (2006.01)
*G01N 29/07* (2006.01)
*H04L 25/49* (2006.01)

(52) U.S. Cl.
CPC ....... *H04L 25/0228* (2013.01); *G01N 29/075* (2013.01); *H04L 25/4902* (2013.01)

(58) Field of Classification Search
CPC ............ H04L 25/0228; H04L 25/4902; H04L 61/6022; H04L 29/12839; H04L 49/351;
(Continued)

(56) References Cited

U.S. PATENT DOCUMENTS 5,195,046 A * 3/1993 Gerardi .................. B64D 15/16
702/35
5,666,379 A * 9/1997 Ovard .................... H04B 1/707
370/213
(Continued)

OTHER PUBLICATIONS

USPTO, International Search Report and Written Opinion, PCT/US2019/025510, dated Jun. 21, 2019.

*Primary Examiner* — Hardikkumar D Patel
(74) *Attorney, Agent, or Firm* — Leveque Intellectual Property Law, PC

(57) ABSTRACT

A system, method and apparatus that includes two or more sensor nodes that obtain sensed data from a structure. A controller receives the sensed data from the sensor nodes, via a network formed by the sensor nodes and the controller. The controller controls functionality of each of the sensor nodes, controls time synchronization among the sensor nodes, detects information collected by the sensor nodes, and communicates, utilizing an M-ary time-reversal based protocol, the detected information using a planar surface of the structure as the transmission medium for elastic waves.

20 Claims, 20 Drawing Sheets

(58) Field of Classification Search
CPC .. G01N 29/075; G01N 27/72; G01N 29/2437; G01N 29/2475; G01N 2291/0423; H04B 14/026; H04B 1/707; H04B 10/541; H04B 10/116; H04B 10/506; G06F 1/1626; G06F 1/163; G06F 1/1632; G06F 1/1686; G06F 1/1698; G06F 3/011; G06F 3/0304; G06F 3/04845; G06F 3/04883; G06V 10/141; G06V 10/147; G06V 10/17; G06V 10/56; G06V 20/20; B64D 15/20; B64D 15/16; G08B 19/02; G01M 5/0033; G01M 5/0091; G01M 5/0066
See application file for complete search history.

(56) References Cited

U.S. PATENT DOCUMENTS

| | | |
|---|---|---|
| 8,344,912 B2 | 1/2013 | Mitchell et al. |
| 9,413,571 B2 | 8/2016 | Jin et al. |
| 10,129,862 B1 * | 11/2018 | Wu .................... H04B 17/318 |
| 2007/0237088 A1 * | 10/2007 | Hidle ............... H04L 29/12839 370/252 |
| 2009/0301198 A1 | 12/2009 | Sohn et al. |
| 2011/0112775 A1 | 5/2011 | Bramban |
| 2013/0279561 A1 * | 10/2013 | Jin .................... H04L 25/4902 375/239 |
| 2015/0236648 A1 | 8/2015 | Ahmad et al. |
| 2015/0257167 A1 * | 9/2015 | Chen .................... H04L 1/0002 370/330 |
| 2017/0021918 A1 | 1/2017 | Silva et al. |
| 2018/0212684 A1 * | 7/2018 | Aoyama ................. G06F 1/163 |

* cited by examiner

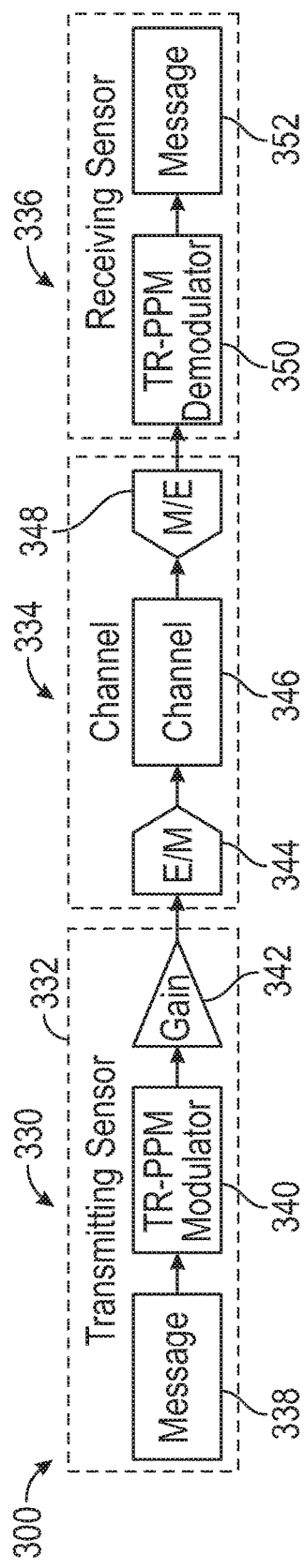
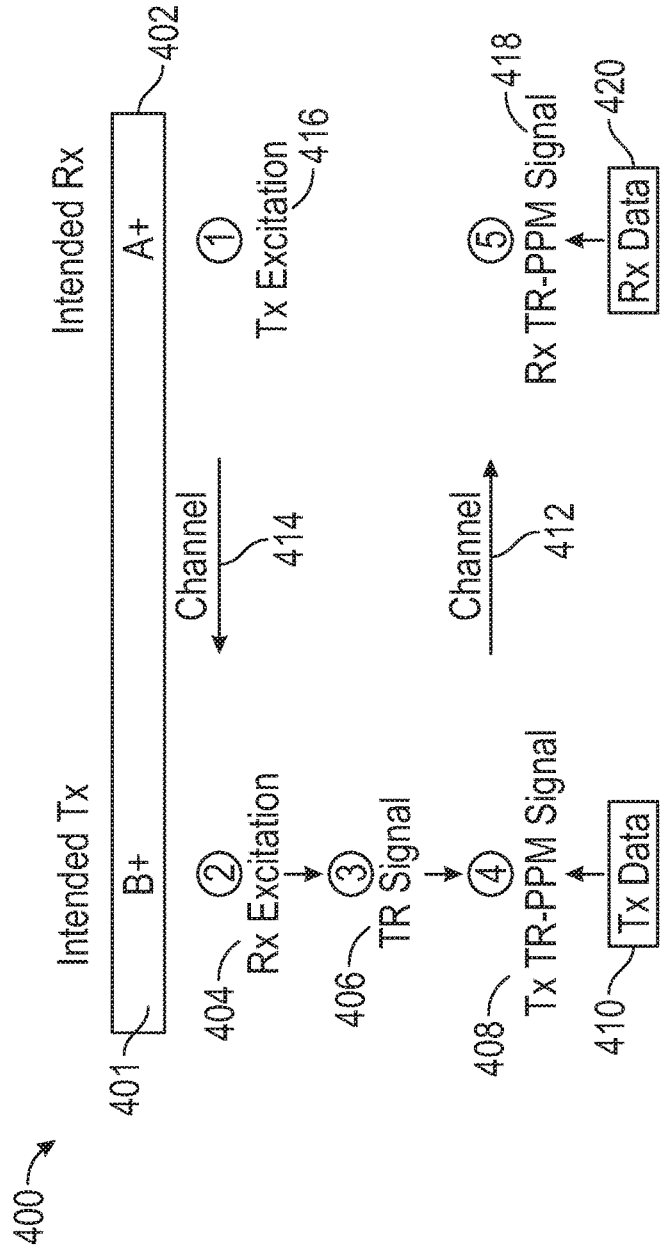

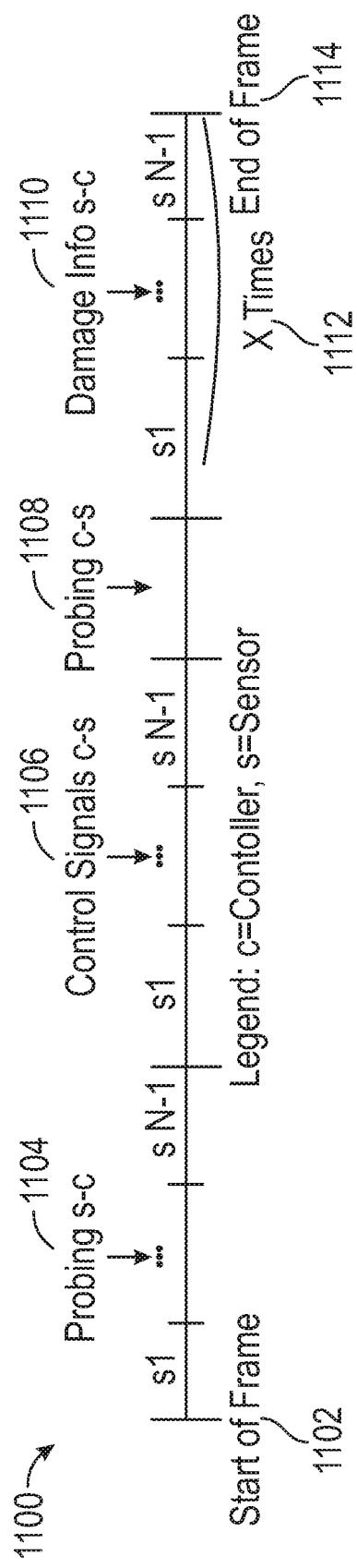
FIG. 11
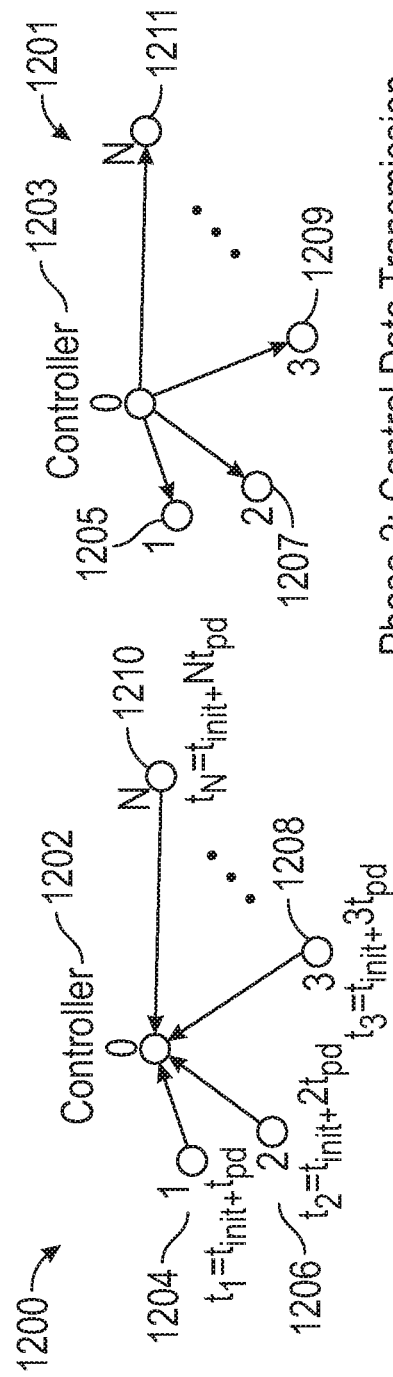
FIG. 12A
FIG. 12B

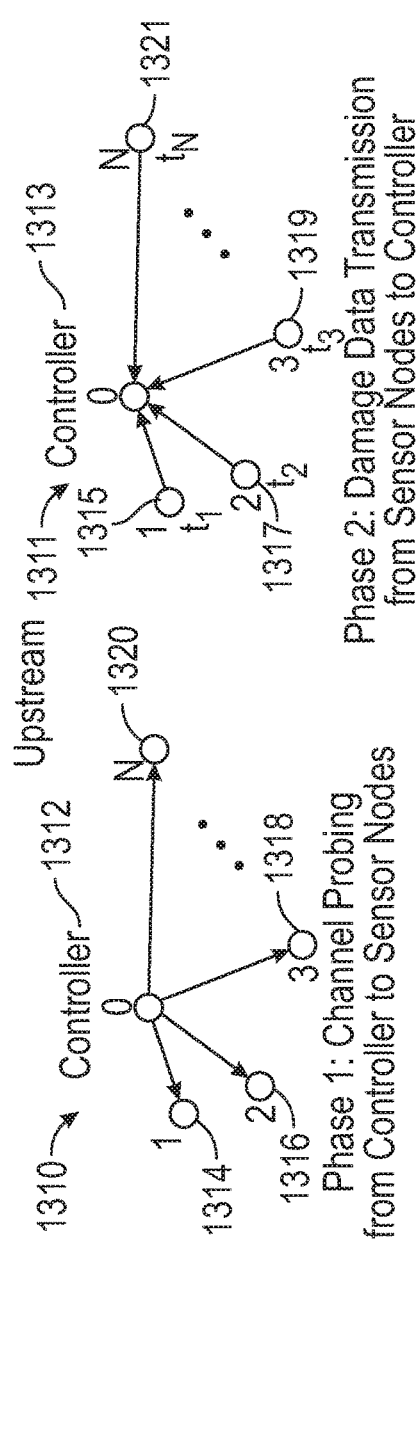
FIG. 13A
FIG. 13B
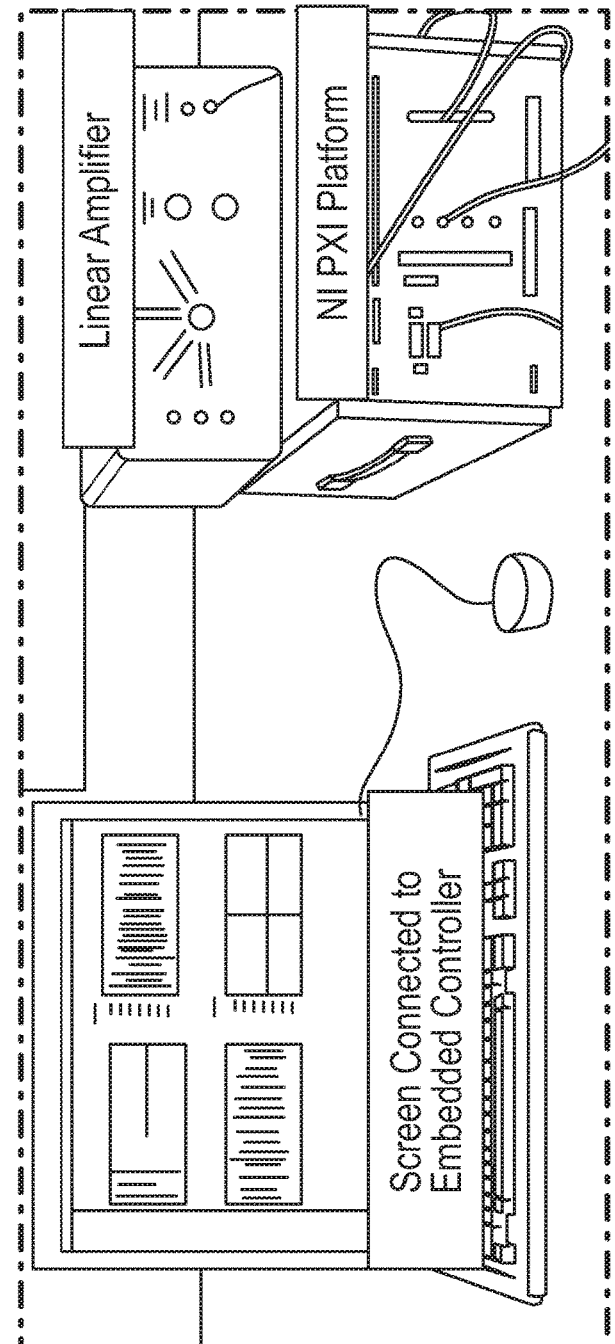
FIG. 14

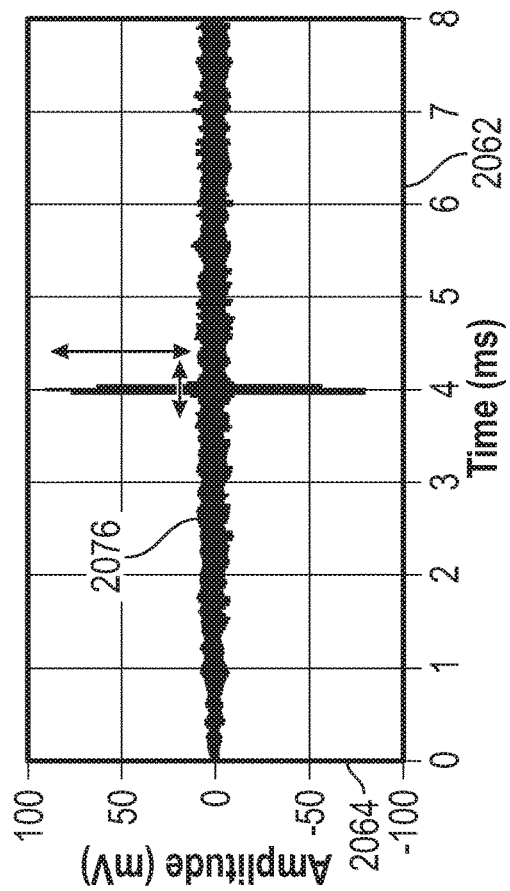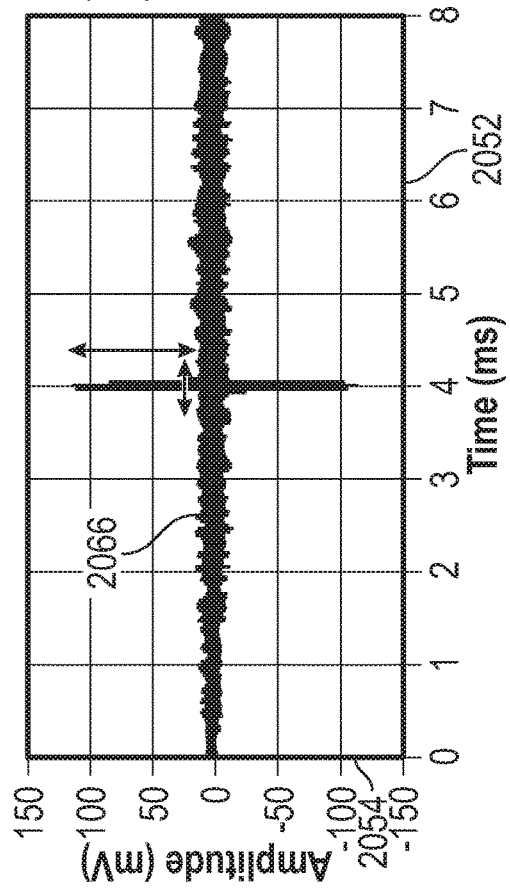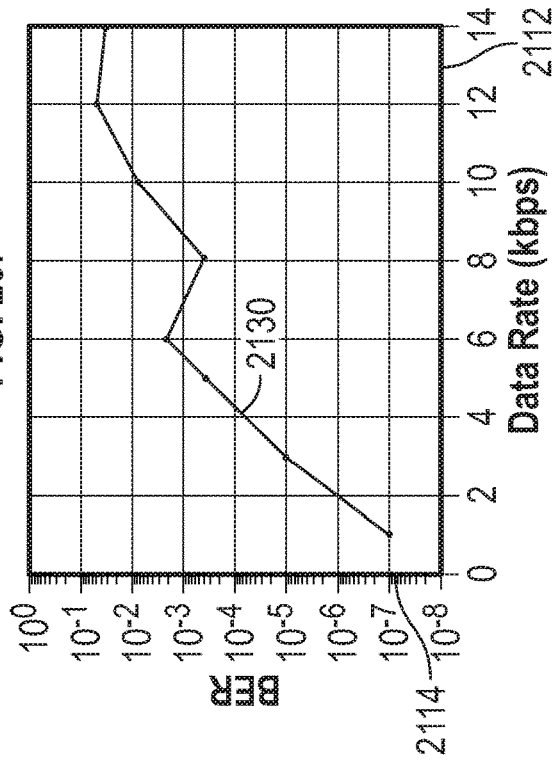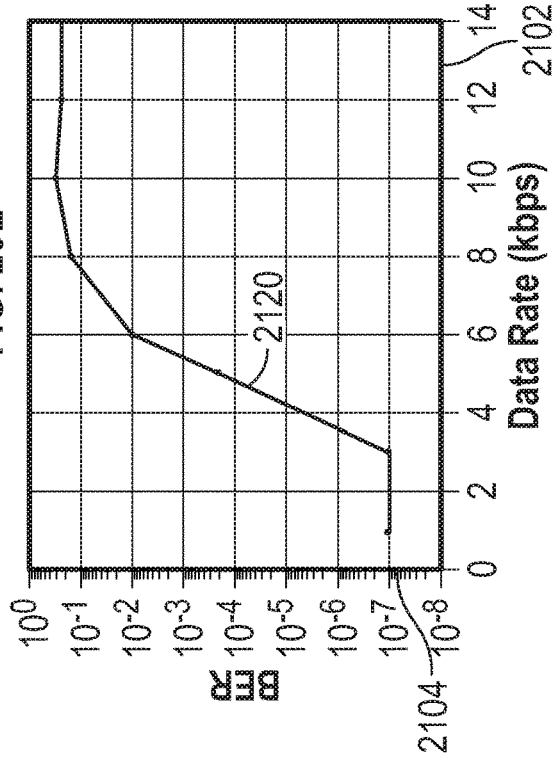

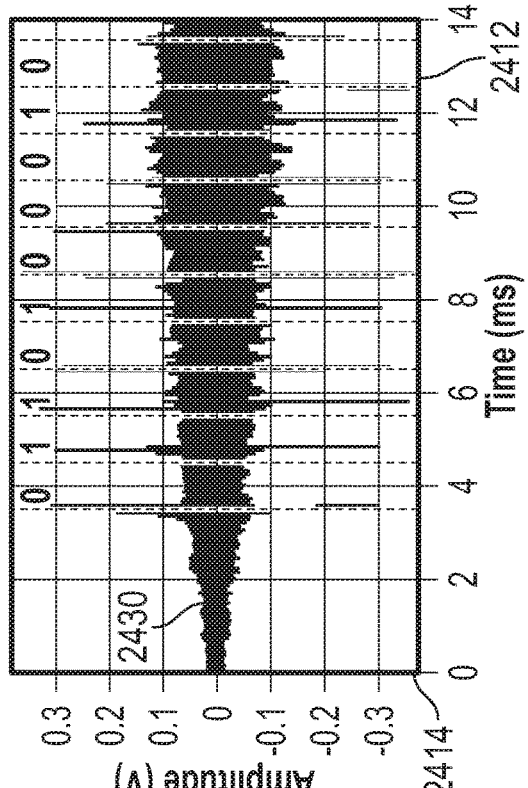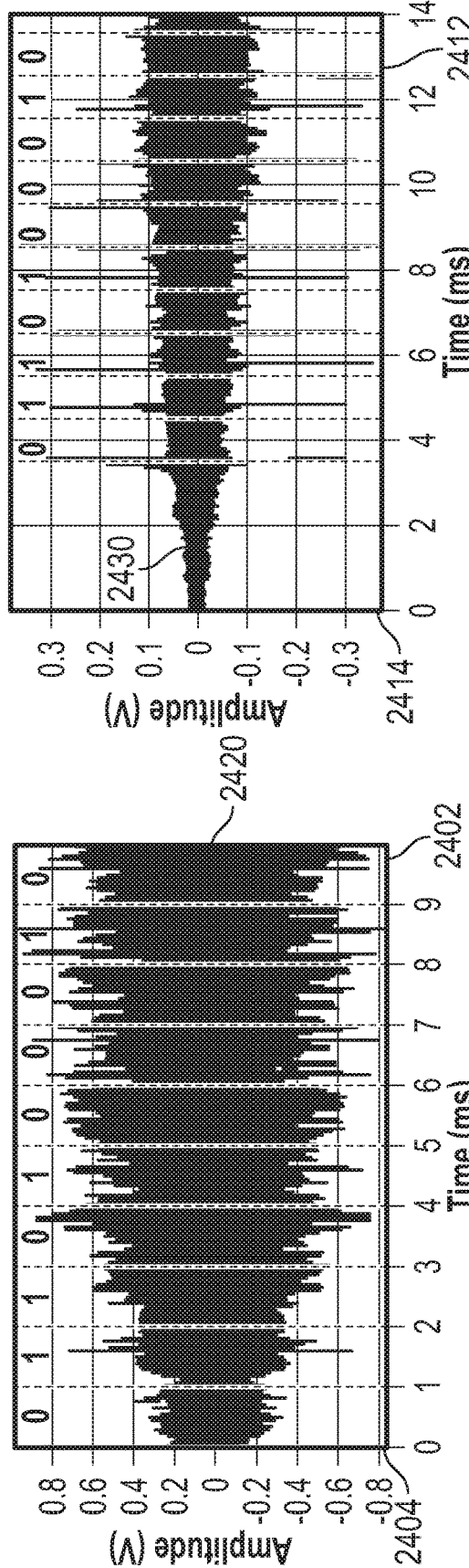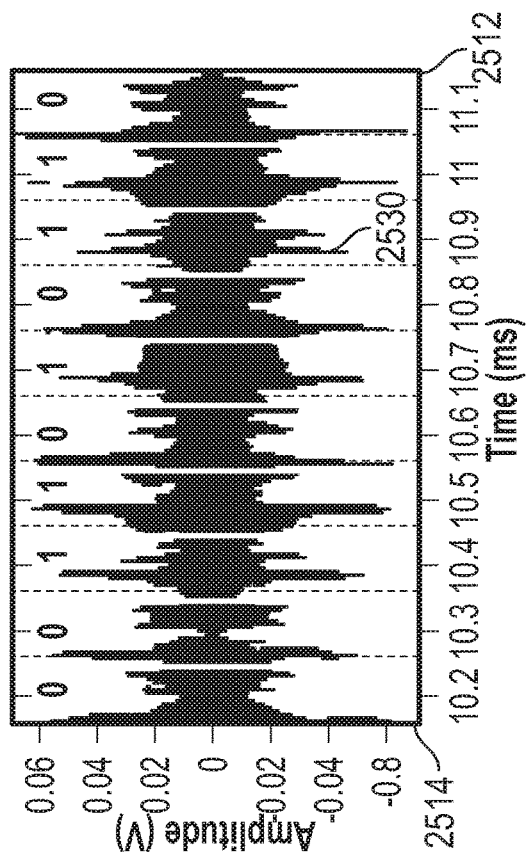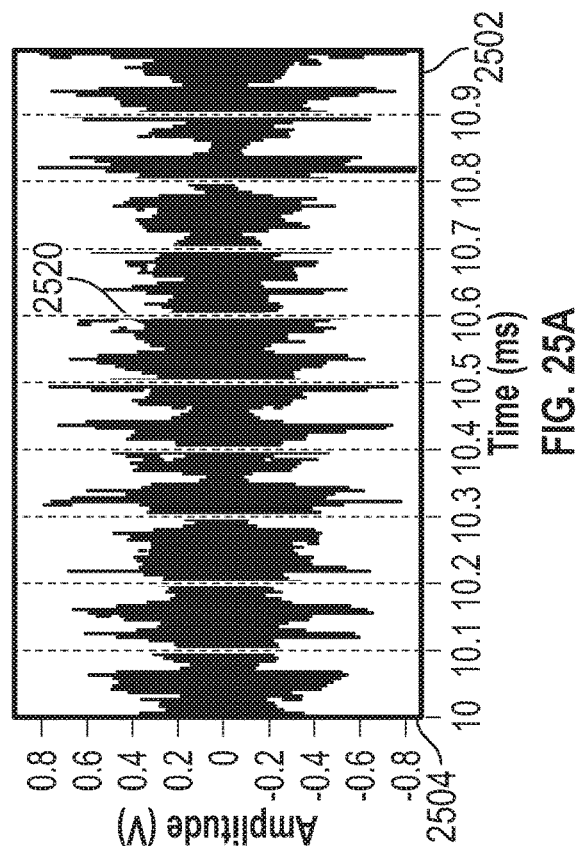

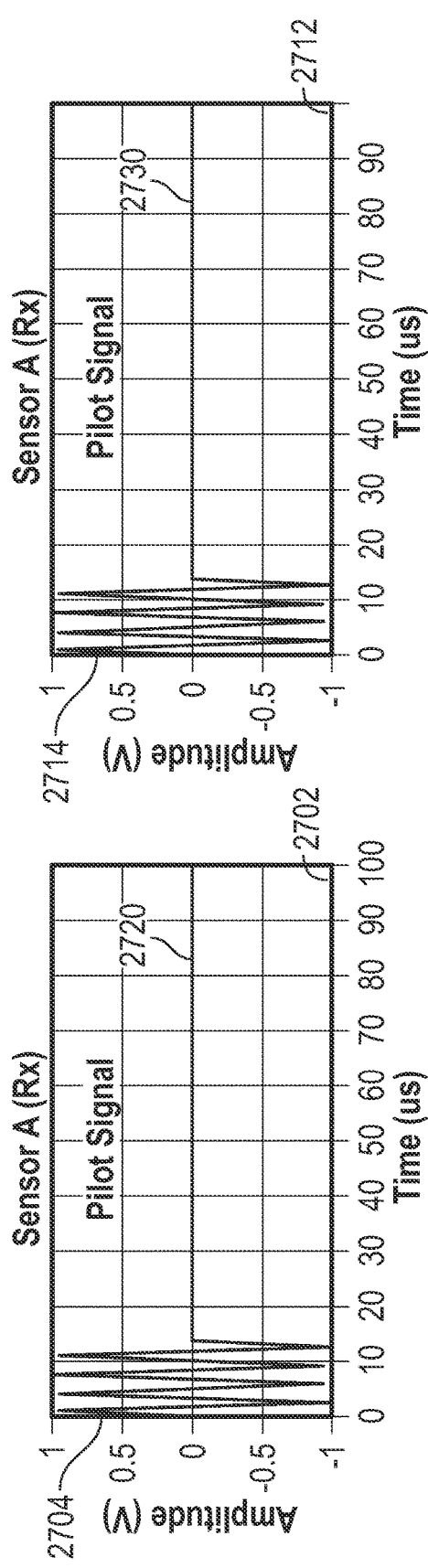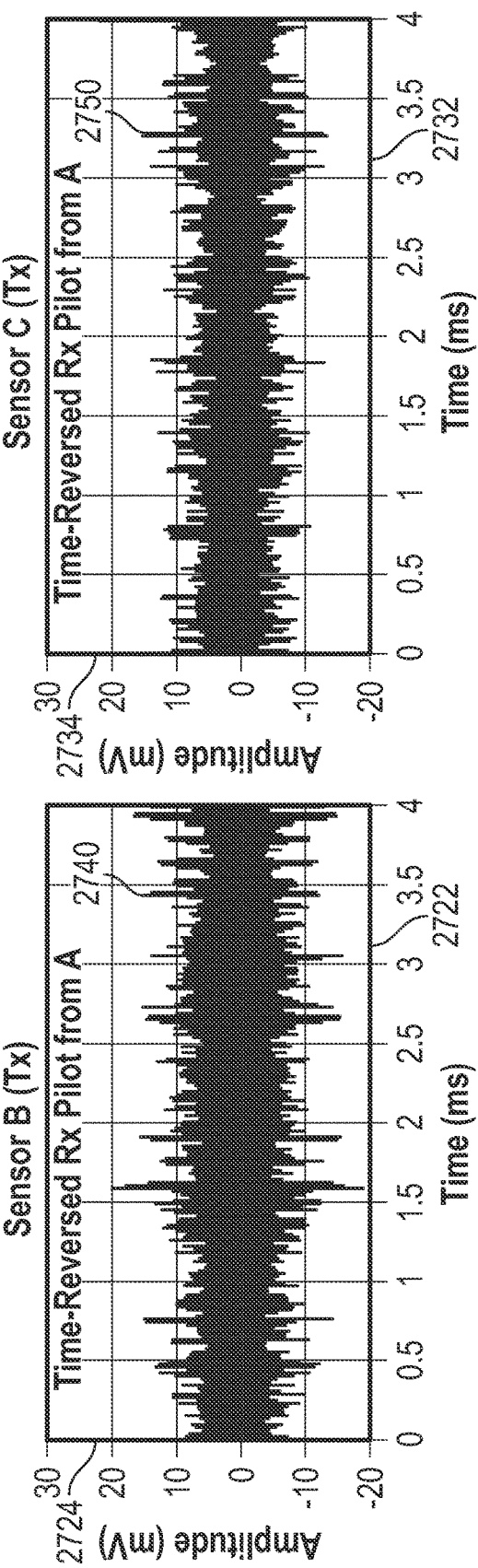
FIG. 27A
FIG. 27B
FIG. 27C
FIG. 27D

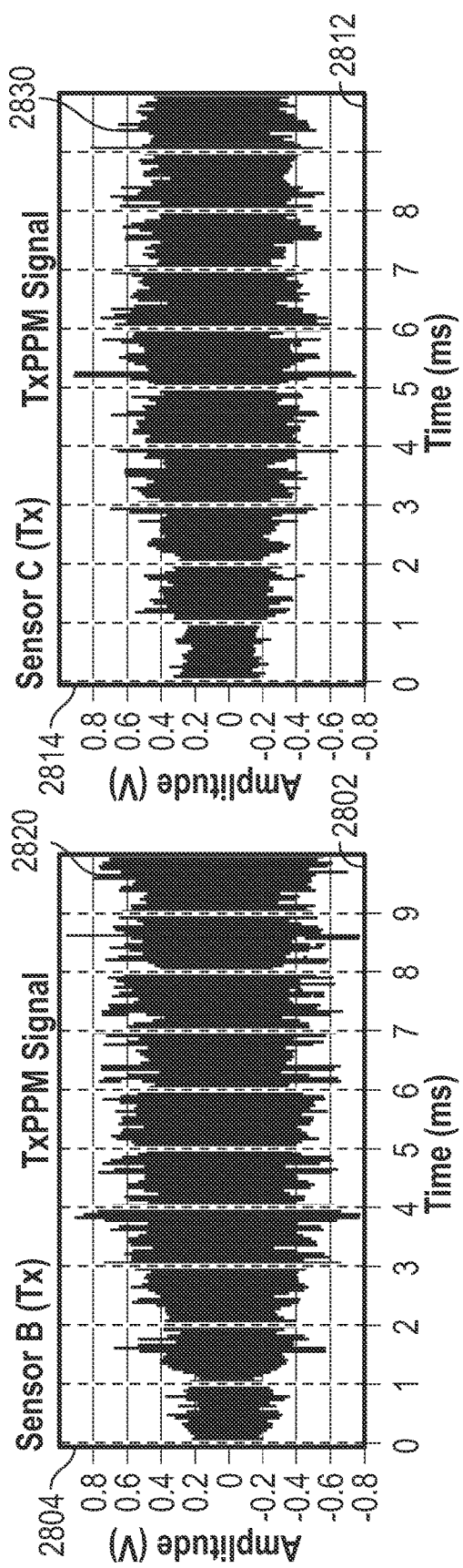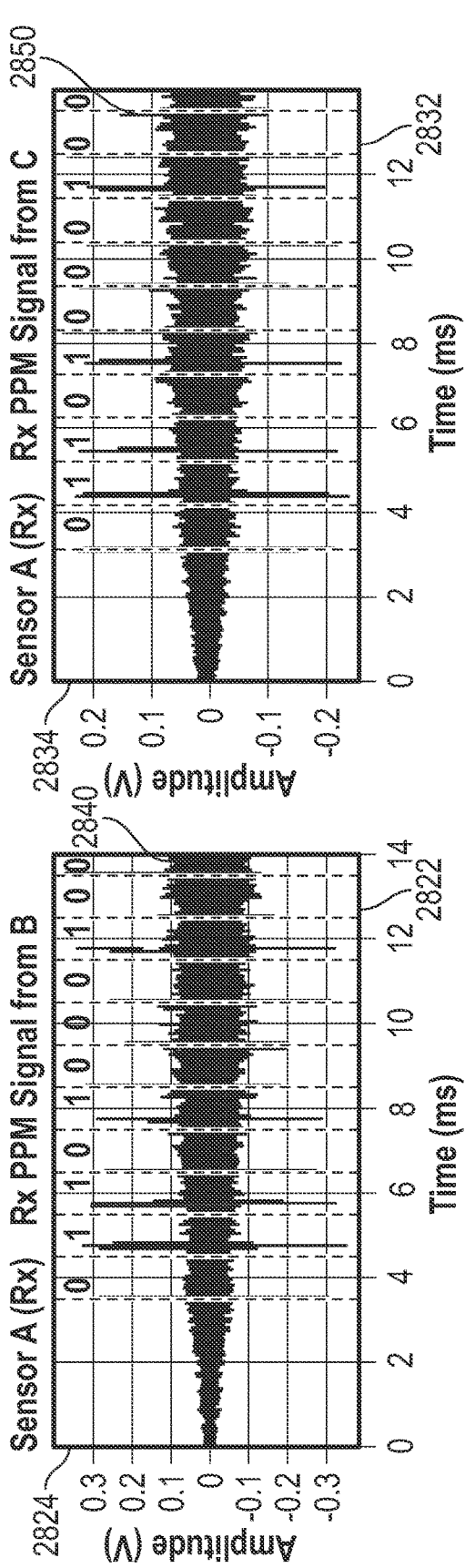

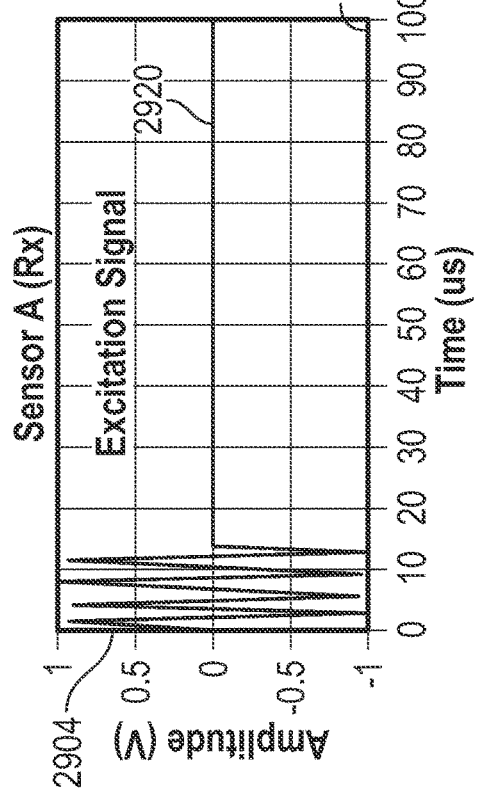
FIG. 29A
FIG. 29B
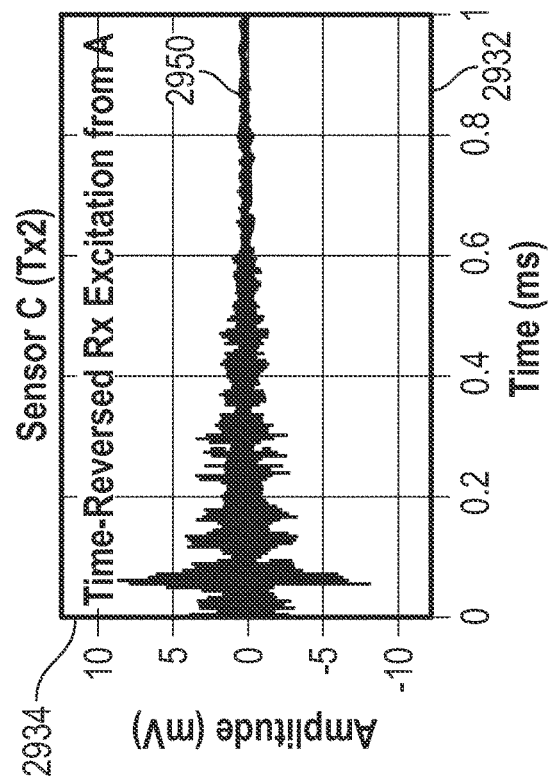
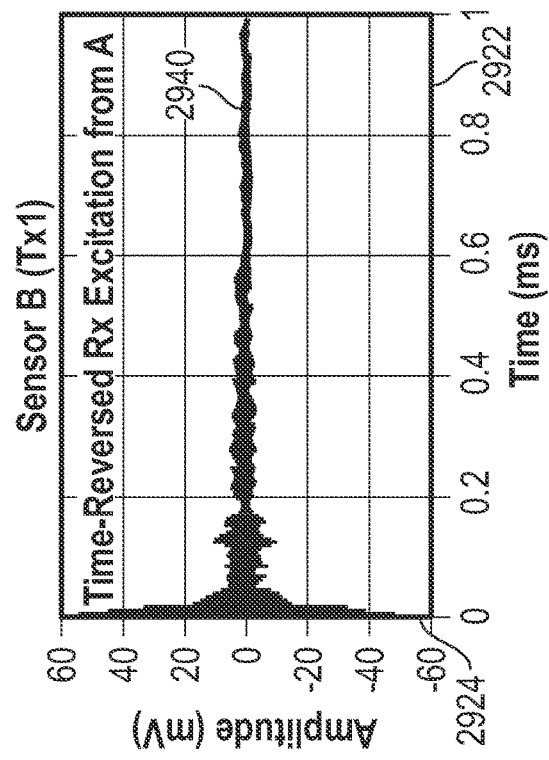
FIG. 29C
FIG. 29D

SYSTEMS, METHODS AND APPARATUS FOR TRANSMISSION OF DATA USING M-ARY TIME REVERSAL PULSE POSITION MODULATION

PRIORITY CLAIM

This application claims the benefit of U.S. Provisional Application No. 62/659,123 filed on Apr. 17, 2018, titled, "Acoustic Wireless Sensor Network System and Method for Structural Health Monitoring of Aerostructures", the entire content of which is hereby incorporated by reference.

GOVERNMENT SUPPORT

This invention was made with government support under NNX17S51P awarded by NASA. The government has certain rights in the invention.

FIELD OF THE DISCLOSURE

The present disclosure relates to a wireless sensor architecture using elastic waves to monitor the status of a structure.

BACKGROUND OF THE DISCLOSURE

Autonomous structural health monitoring (SHM) of aerostructures strengthens the reliability, increases the lifetime, and reduces the maintenance cost of aero-vehicles such as airplanes and unmanned aerial vehicles (UAV). The continuous monitoring of aerostructures for early detection and identification is typically achieved by collecting sensor data that is communicated to a central unit for real-time data processing using electromagnetic waves at radio frequencies (RF). However, the emission of RF signals for autonomous SHM creates additional sources of interference to on-board RF communication systems used for aircraft control and safety-related services. Therefore, it would be an advancement in the art for a system of monitoring that does not rely on RF communication.

BRIEF SUMMARY OF THE DISCLOSURE

It will be understood that the disclosure is not limited to the embodiments described herein. To the contrary, it includes all alternatives, modifications, and equivalents as may be included within the spirit and scope.

Embodiments of the present disclosure are directed to systems, methods and apparatus for a wireless sensor architecture using elastic waves to monitor the status of a structure by using one or more sensors, embedded in or on the structure, to obtain sensed data of the structure and utilizing at least a portion of the structure as the transmission medium between a sensor and a controller.

One embodiment of the disclosure is directed to an apparatus that includes one or more sensors adapted to obtain sensed data of a structure, where the one or more sensors are integral to the structure. A controller receives the sensed data from the one or more sensors via a transmission channel of the structure. The structural channel provides a structural medium for the propagation of elastic waves according to a protocol.

Another embodiment of the disclosure is directed to an apparatus that includes two or more sensor nodes that obtain sensed data from a structure. The sensor nodes are integral to the structure. A controller receives the sensed data from the sensor nodes, via a network formed by the sensor nodes and the controller. The controller controls: functionality of each of the sensor nodes; time synchronization among the sensor nodes; detection of information, such as damage detection, collected by the sensor nodes; and communication, utilizing a time-reversal based protocol, the detected information using a planar surface of the structure as the transmission medium for elastic waves.

Yet another embodiment of the disclosure is directed a method that identifies an incoming signal containing information, such as structural health information, of a structure, from a plurality of sensor nodes integral to the structure. A portion of the structure is used as a channel. A determination is made that is both related to channel probing and responsive to the determination: utilizing one or more time reversal protocols based on the determination of channel probing to propagate elastic waves through the structural channel of the structure, the elastic waves including at least a portion of the information of the incoming signal.

BRIEF DESCRIPTION OF THE DRAWINGS

The accompanying drawings, which are incorporated in and constitute a part of this specification, illustrate embodiments of the present disclosure and, together with a general description given above, and the detailed description given below, explain the principles of the present disclosure.

FIG. 3 shows a description of data bit exchanges between sensors according to an embodiment of this disclosure.

FIG. 4 shows M-ary time reversal pulse position modulation and demodulation (M-TRPPM) procedure.

FIG. 11 shows TR-TDMA (time-reversal time division multiple access) scheduling.

FIGS. 12A and 12B show phase 1 and phase 2 downstream control signal transmission during network initialization.

FIGS. 13A and 13B show phase 1 and phase 2 upstream channel probing and data transmission.

FIG. 14 shows a measurement apparatus.

FIGS. 20A-F show graphs of excitation signal comparison between a rectangular windowed toneburst and a Gaussian modulated toneburst.

FIGS. 21A and 21B show simulated BER vs data rate for a 4-cycle toneburst and a Gaussian-modulated toneburst.

FIGS. 24A and 24B show a TR-PPM data exchange between two sensors including the transmitted signal and received signal.

FIGS. 25A and 25B show a TR-PPM modulated data exchange.

FIGS. 27A-27D show recorded channel response to an excitation signal.

FIGS. 28A-28D show received data signals on a specimen.

FIGS. 29A-29D show recorded channel responses to an excitation signal broadcast from a sensor that is disposed on a specimen.

Figure 1:
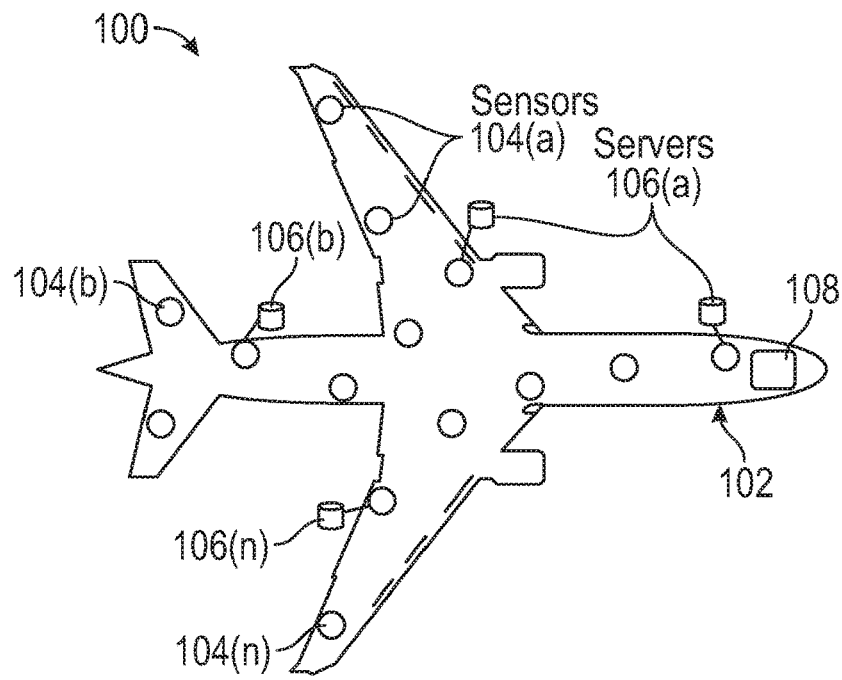
FIG. 1 shows a diagram of an aircraft with a wireless sensor network (WSN).

It should be understood that the appended drawings are not necessarily to scale, presenting a somewhat simplified representation of various features illustrative of the basic principles of the disclosure. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE DISCLOSURE

The following examples illustrate properties and advantages of some of the embodiments of the present disclosure. Furthermore, these are examples of reduction to practice of the present embodiments and confirmation that the principles described in the present disclosure are therefore valid but should not be construed as in any way limiting the scope of the disclosure.

Although the following detailed description contains many specifics for the purposes of illustration, anyone of ordinary skill in the art will appreciate that many variations and alterations to the following details are within the scope of the disclosure. Accordingly, the following embodiments are set forth without any loss of generality to, and without imposing limitations upon, the claims.

In this detailed description, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present disclosure.

Unless stated otherwise, terms such as "first" and "second" are used to arbitrarily distinguish between the elements such terms describe. Thus, these terms are not necessarily intended to indicate temporal or other prioritization of such elements.

Furthermore, in this detailed description, a person skilled in the art should note that quantitative qualifying terms such as "generally," "substantially," "mostly," "approximately" and other terms are used, in general, to mean that the referred to object, characteristic, or quality constitutes a majority of the subject of the reference.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

This disclosure describes a wireless network, such as an acoustic wireless sensor network (AWSN) architecture and system using elastic waves, such as Lamb waves, to facilitate monitoring of a structure, such as structural health monitoring (SHM) technologies for aero-structures such as that of spacecraft, under water craft, aircraft, unmanned aerial vehicles, and other plate-like structures or any structure that may be used as a transmission medium for Lamb waves, elastic waves or acoustic waves.

As disclosed, both detection, such as damage detection, and wireless communication are performed using guided elastic waves. Data communication across an elastic channel is challenging because of the severe frequency-dispersive and multimodal propagation in solid media which distorts, delays, and greatly attenuates the transmitted data signals. To cope with this problem, a sensor network based on time-reversal pulse position modulation that compensates for channel dispersion and improves the signal-to-noise ratio of the communication link without relying on sophisticated channel estimation algorithms is disclosed herein. The viability of the presented embodiments is demonstrated by experiments, including experiments conducted on a homogeneous and isotropic aluminum plate specimen using Lead Zirconate Titanate (PZT) sensor discs at a resonant frequency of 300 kHz.

Wireless sensor networks (WSN) provide advantages in the field of structural health monitoring of aero-structures because of attractive characteristics such as the reduction of wires and reduction of cable runs that represent substantial additional weight on the aircraft or spacecraft and a logistical problem for maintenance and troubleshooting. Wireless communications enable data transfer across remote and difficult to reach locations that are to be sensed and monitored. Compared with traditional radio frequency (RF) data transmission in a typical WSN, the disclosed acoustic wireless sensor network overcomes the limitations of RF signal congestion or electromagnetic shielding materials or structures in the path of data communication.

As disclosed herein, AWSN technology permits design and implementation of an acoustic wireless sensor network (AWSN) architecture and protocols based on time-reversal pulse position modulation (TR-PPM) using elastic waves, or Lamb waves, as the carrier signal for communication. This enables wireless communication by Lamb waves over aero-structures among all the sensor nodes that are mounted or embedded in the structure. Elastic wave, or Lamb wave, propagation on plates or plate-like materials represents a highly attenuated multipath fading and dispersive propagation in terms of data communications. To cope with the multimodality and high dispersion of Lamb waves, the time-reversal principle is used as a dispersion compensation technique.

The disclosed AWSN includes: (1) A network management entity that supervises the network operation of each sensor as well as the design partitioning between detection data, such as damage detection, and time-reversal data communication phases for SHM applications; (2) A new modulation technique called M-ary time-reversal pulse position modulation (M-TRPPM) for wireless information exchange through the aero-structure itself using Lamb waves; (3) A time-reversal based sensor-to-sensor (TR-STS) communication protocol that regulates the communication between a pair of sensors mounted or embedded in the structure; (4) A multi-sensor time-reversal based communication protocol called time-reversal time division multiple access (TR-TDMA) that controls the data exchange between multiple sensors and a controller; and (5) Laboratory experimentation and validation of the disclosed AWSN on an aluminum plate specimen, an aluminum bar specimen, and an aluminum elevator of the tail-plane with coating of an Ercoupe™ 415-C airplane.

The disclosed acoustic wireless sensor network (AWSN) includes a multi-level centralized topology comprising a single base-station and a plurality of distributed sub-networks separated by the region of their spatial location. Each sub-network is composed of one sink node, also referred to as a controller and/or coordinator, and one or more sensor nodes. Multiple sub-networks are deployed on the aero-structure to ensure high coverage of the monitored infrastructure.

FIG. 1 shows a diagram 100 of structure 102, which may be an aircraft, or aero-structure, space vehicle, underwater device or other object, with a wireless sensor network. The sensors 104(a) . . . (n), where "n" is any suitable number (generally 104) may be individually operable or may be sensor nodes when the sensor nodes are part of a network. Controllers, sink nodes or coordinators 106(a) . . . (n) where "n" is any suitable number, and base station 108 are also shown. The sensors and/or sensor nodes 104 are active sensors that actuate and sense the structure 102, shown as an aero-structure, for damage detection.

The sensors and/or sensor nodes 104 are integral to the structure 102. Thus, the sensors and/or sensor nodes 104 are mounted on the structure 102, disposed on the structure 102 or embedded in the structure 102, or any combination thereof. They may also operate as acoustic wireless sensors or sensor nodes, elastic wave sensors or elastic wave sensor nodes, which communicate with one or more controllers, coordinators, or sink modules and/or sink nodes 106(a) . . . (n), where "n" is any suitable number, to receive instructions and transmit the collected data samples for damage detection.

The controller(s) (sink module(s)) 106 may be interconnected to form a network, in which case the controller(s) (sink module(s)) may be considered sink nodes (106).

The number of sensors and/or sensor nodes (104) may be any suitable number and the number of controllers, also referred to as sink modules and/or sink nodes herein, (106) may also be any suitable number and the quantity of sensors and/or sensor nodes need not equal the number of sink modules and/or sink nodes.

Each sink node, generally 106, is connected to an on-board base-station 108 via a cable or radio connection, wired, or wireless communication technique. The base station 108 is the primary interface between the user and the sensor network.

The wireless sensor network may comprise one or more sensors and/or sensor nodes 104 and one or more sink modules and/or controllers, or sink nodes 106. The wireless sensor network may be an acoustic wireless sensor network or a wireless network that transmits elastic waves and/or Lamb waves.

One or more subnetworks, which may be wireless subnetworks, wireless acoustic subnetworks or a wireless subnetworks that transmit elastic waves and/or Lamb waves may be formed by portions of a larger network.

The controllers, also referred to as coordinators or sink modules and/or sink nodes, 106 may be operatively coupled to one or more servers, which are located in the base station 108.

The base station 108 activates each subnetwork in a time-dependent fashion and processes collected data samples using centralized SHM (structural health monitoring) algorithms. The base station 108 also interprets sensed information about damage detection and alerts the user to the location and nature of identified structural damages for condition-based maintenance scheduling. One subnetwork comprises one sensor 104 and one sink module 106. The term "module" is used when the sensor or sink is operated individually and the term "node" indicates that the sensor or sink is operated in a network environment.

When activated, each subnetwork may operate independently of each other subnetwork as a centralized Lamb wave, elastic wave, or acoustic wave, wireless sensor network or a wireless network that utilizes any suitable wave-type that utilizes, or is adapted to utilize, a structure for propagation.

Indeed, any suitable structure that serves as a propagation medium utilizing any suitable wave-type is an embodiment of this disclosure. The sensor and/or sensor node 104 and controller, sink module and/or sink node 106 are optimized for low-power and high-storage functionality while the base station 108 handles high power-consuming SHM (structural health monitoring) algorithms over a large number of collected data samples.

Figure 2:
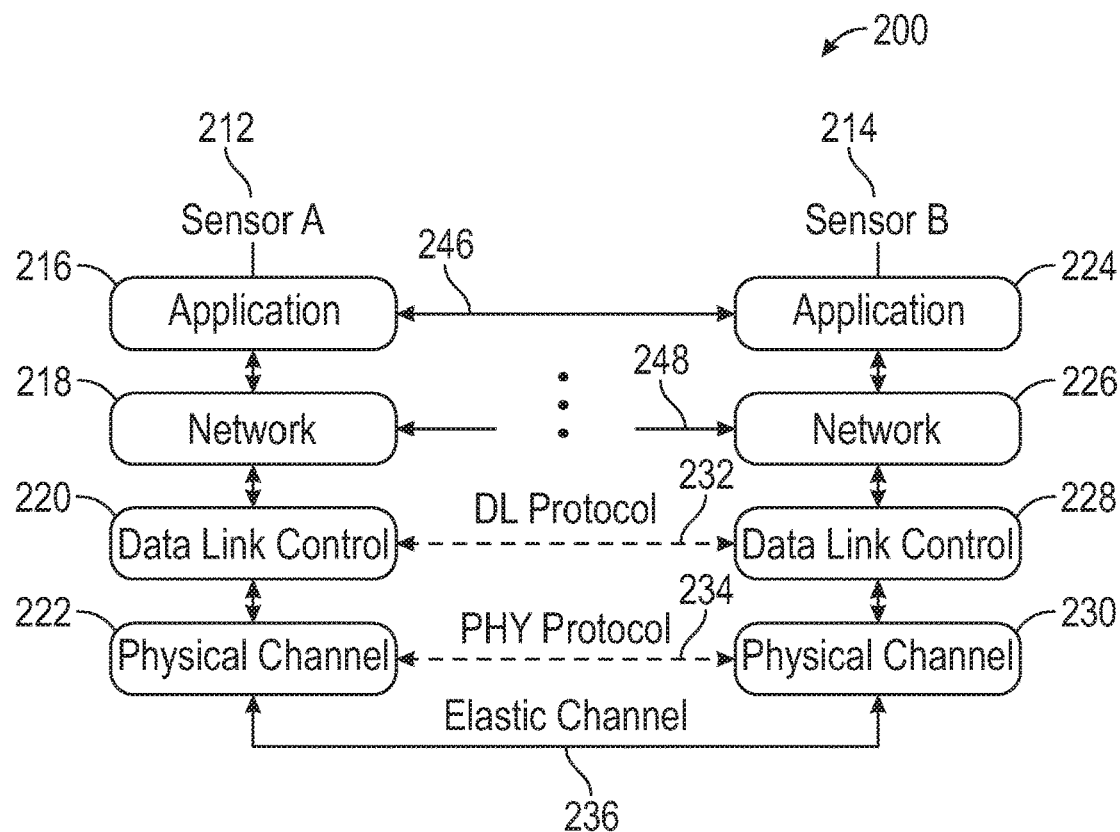
FIG. 2 shows a layered model of the wireless sensor network (WSN) architecture according to an embodiment of this disclosure.

FIG. 2 shows a layered model of an embodiment of a wireless sensor network (WSN) 200. Sensor node A 212 and sensor node B 214 each have a network architecture composed of four layers of abstraction: applications layer 216, 224 for sensor node A and sensor node B, respectively; network layer 218 and 226 for sensor node A and sensor node B, respectively; data link control 220 and 228 for sensor node A and sensor node B, respectively; and physical channel layers 222 and 230 for sensor node A and sensor node B, respectively. Interfaces 232, 234, 236, 246 and 248 are also shown in FIG. 2.

An associated protocol provides an interface between the various layers. This is shown as DL (data link) protocol 232 that interfaces data link layers 228 and 220, PHY (physical channel) protocol 234 that interfaces between physical channel layers 222 and 230, network protocol 248 and application protocol 246 that interface between network and application layers, respectively. These interfaces 232, 234, 246 and 248 provide bi-directional translation between the particular layers.

Elastic channel 236 is a propagation mechanism between layers, as shown by physical channels 222 and 230 being operatively coupled, or in communication with each other via elastic channel 236.

The propagation may be bi-directional propagation between two layers and/or two nodes and/or other sensors and/or controllers (sinks). Propagation may also be considered transmission and/or reception and/or a combination of transmission and reception.

The application layer 216, 224 associated with sensor A and sensor B, respectively, is a program that controls damage detection, data communication and energy savings. This functionality may include controlling manipulation or processing of data such as collecting, transferring and/or storing the digital damage identification signals into actionable information data. The application layer may also transform the digital damage identification signals into actionable information data.

The network layer 218, 226 is used for structural monitoring and may comprise a centralized network in a star topology. The network layer 218, 226 may also route the transmitted data from the sensor and/or sensor node to the sink module and/or sink node, also referred to as a controller or coordinator or controller module or coordinator module.

The data link layer, or data link control, 220, 228 is a planar channel, such as an elastic wave channel that may be shared among multiple sensors and/or sensor nodes following the TR (time reversal) based TDMA protocol. This layer 220, 228 may also divide the digital bits to be transmitted into a sequence of data frames of fixed length in order to reduce the duration of each transmission. The data link layer 220, 228 also defines a sensor-to-sensor (STS) and multi-sensor procedure to regulate the exchange of information across the structure.

The physical layer, or physical channel, 222, 230 permits communication to be performed in a point-to multipoint configuration based on TR-PPM modulation. This layer 222, 230 deals with the actual data transmission over the structure, which may be via an elastic wave, acoustic wave, Lamb waves through signal modulation and demodulation.

The physical layer (PHY) 222, 230 and the data link layer (also called the MAC (media access control) layer) 220, 228 enables sensor-to-sensor and multi-sensor communication by dispersive Lamb waves across the aero-structure itself.

The physical layer (PHY) 222, 230 is responsible for transmitting the information data symbols across the planar channel, or plate-like structure. To do so, the data bit stream (the message) is embedded via modulation in the characteristics of a carrier signal, which is converted into waves, such as elastic, Lamb or acoustic waves using a piezoelectric transducer.

FIG. 3 shows a description 300 of data bit exchanges between sensors according to an embodiment of the disclosure. This may also be considered a block diagram of the communication link between two sensors at the physical layer. FIG. 3 describes a block diagram of sensor-to-sensor communication at the physical layer. At the transmitting side, the message bits are encoded using a TR-PPM modulator. At the receiving side, a TR-PPM demodulator is employed to retrieve the transmitted message.

FIG. 3 includes a transmitter sensor 330, a channel 334 and a receiving sensor 336.

The transmitting sensor 330 includes message data 338, TR-PPM modulator 340 and gain amplifier 342.

The channel 334 includes an E/M module 344, channel module 346, which may be an acoustic channel and M/E module 348.

The receiving sensor 336 includes a TR-PPM demodulator 350 and message 352.

The amount of energy transformed from electrical to mechanical energy and vice-versa is determined by the transducer's (sensor's) electromechanical-mechanoelectrical (E/M-M/E) coupling coefficient. Because of the unique considerations posed by wave propagation on elastic solids, M-ary time-reversal pulse position modulation (M-TRPPM) compensates for Lamb waves dispersion and multimodal propagation on plate-like structures.

At the transmitting side (shown by transmitting sensor 330), the digital message 338 is encoded using an M-ary TR-PPM modulator 340. A signal amplifier (gain) 342 is used to increase the amplitude of the generated signal.

The communication channel 334 is modeled by the actual acoustic channel 346 and the E/M module 344 and M/E module 348 coupling coefficients of the piezoelectric sensors. At the receiving side 336, an M-TRPPM demodulator 350 is employed to retrieve the transmitted message 352.

Also disclosed are acoustic channel characteristics. Waves propagating on or through a solid media are called elastic waves. Elastic waves can be classified as transverse waves or longitudinal waves. Elastic waves are classified as transverse waves when the displacement of the medium is perpendicular to the direction of wave propagation. Elastic waves are classified as longitudinal waves when the displacement of the medium is parallel to the direction of wave propagation. On thin plate-like structures, waves propagate within the boundaries of the plate and are thus considered guided elastic waves called Lamb waves. Lamb waves are made of a combination of transverse and longitudinal waves that reflect on the boundaries and edges of the plates in two different modes known as symmetric and antisymmetric modes.

The propagation characteristics of Lamb waves on isotropic plates with homogeneous properties are given by the Rayleigh-Lamb dispersion relations defined as $$\frac{\tan(\alpha d/2)}{\tan(\beta d/2)} = \left[\frac{-4k^2\alpha\beta}{(\beta^2 - k^2)^2}\right]^{\pm 1} \tag{1}$$

where k is the wave number, d is the plate thickness, and α and β are a function of the wave frequency f as given by $$\alpha^2 = \left(\frac{2\pi f}{v_L}\right)^2 - k^2 \text{ and } \beta^2 = \left(\frac{2\pi f}{v_T}\right)^2 - k^2. \quad (2)$$

$v_L$ is the velocity of longitudinal waves and $v_T$ is the velocity of transverse waves. The exponent ±1 equals +1 for Lamb waves propagating in symmetric modes $S_n$, $n=0, 1, 2, \ldots$ and −1 for asymmetric modes $A_n$, $n=0, 1, 2, \ldots$. The longitudinal and transverse waves velocities are expressed as $$v_L = \sqrt{\frac{\lambda + 2\mu}{\rho}} \text{ and } v_T = \sqrt{\frac{\mu}{\rho}} \quad (3)$$

where ρ is the mass density of the solid media, and λ and μ are Lamé constants which depend on the modulus of elasticity of the solid and Poisson ratio.

The dispersion relations are interpreted by the dispersion curves, which represent variations of the wave phase and group velocities as a function of the frequency-thickness product. Since equation (1) is a nonlinear equation, it may be deduced that the wave frequency is a nonlinear function of the wave number. Therefore, the phase and group velocities are a function of the frequency and are not equal. Thus, the solid plate structure is a dispersive medium in which waves propagate with amplitude distortion and random phase shift.

As stated previously, at the transmitting side, the message bits are encoded using a TR-PPM modulator 340. A signal amplifier is also used to increase the amplitude of the generated elastic waves. The communication channel modeled by the actual acoustic channel and the E/M and M/E coupling coefficients of the piezoelectric sensors.

At the receiving side, a TR-PPM demodulator 350 is employed to retrieve the transmitted message.

Time-reversal focusing—The capacity of the time-reversal (TR) mechanism to considerably increase the signal-to-noise ratio of the received signal has made this technique a popular solution for communication systems in environments prone to multipath propagation and dispersion. Without employing any channel estimation technique, TR focusing between two sensors A and B is actively obtained in two phases. One phase typically goes from sensor A to sensor B. A second phase typically goes from sensor B to sensor A. The phases, while labelled one and two, do not necessarily have to be performed in a particular sequence. The first phase consists of probing the elastic channel by sending a real-valued excitation signal e(t) of length $T_0$ at sensor A and recording the corresponding channel response p(t) at sensor B over a time duration $T_1$ as defined by $$p(t) = [e(t) * h_{AB}(t)] \cdot rect\left(\frac{t}{T_1} - \frac{1}{2}\right) \quad (4)$$

where $h_{AB}$ (t) is the real-valued channel impulse response (CIR) between the sensors A and B. The rectangular function rect(u) is given by $$rect(u) = \begin{cases} 1 & |u| \leq \frac{1}{2} \\ 0 & \text{otherwise} \end{cases} \quad (5)$$

The recording duration $T_1$ is chosen to be very large compared to the length of excitation signal ($T_1 \gg T_0$) so as to capture the effect of signal dispersion and approximate the actual infinite CIR of dispersive elastic waveguides. Equation (4) illustrates that the information about the channel characteristics is embedded in the received signal through the CIR $h_{AB}(t)$. The received signal p(t) is then scaled, time-reversed, and shifted by the time constant $T_1$ to obtain a signal x(t) in the positive time axis as described by $$x(t) = kp(-t) * \delta(t - T_1) \quad (6)$$

$$= \begin{cases} ke(-t + T_1) * h_{AB}(-t + T_1) & 0 \leq t \leq T_1 \\ 0 & \text{otherwise} \end{cases}$$

where k is the energy scaling factor that matches the energy $E_x$ of the time-reversed signal x(t) to the energy $E_0$ of the excitation signal e(t). The scaling factor k is defined as $$k = \sqrt{\frac{\int_0^{T_0} e^2(t)dt}{\int_0^{T_1} p^2(t)dt}} \quad (7)$$

In the second phase of active time-reversal, the time-reversed signal is sent from sensor B to sensor A. In accordance with the reciprocity principle in wave propagation theory, the back-propagating signal x(t) follows the same paths as the excitation signal e(t) transmitted during the first phase of time-reversal. Therefore, the CIR $h_{BA}(t)$ is substantially identical to the CIR $h_{AB}$ (t) as long as sensors A and B remain at the same spatial location and as long as no external factor changes the elastic medium between the two phases of time-reversal. The received signal y(t) at sensor A is expressed as $$y(t) = [x(t) * h_{AB}(t)] \cdot rect\left(\frac{t}{T_2} - \frac{1}{2}\right) \quad (8)$$

$$= \begin{cases} ke(-t + T_1) * h_{AB}(-t + T_1) * h_{AB}(t) & 0 \leq t \leq T_2 \\ 0 & \text{otherwise} \end{cases}$$

$T_2$ is the recording duration of y(t) which is at least twice as long as $T_1$, $T_2 \geq 2T_1$. For $0 \leq t \leq T_2$, y(t) is given by $$y(t) = k\, e(-t+T_1) * R_{h_{AB}}(t-T_1) \quad (9)$$

where $R_{h_{AB}}(t)$ is the channel autocorrelation function defined as $$R_{h_{AB}} = \int_{-\infty}^{+\infty} h_{AB}(\tau-t) h_{AB}(\tau) d\tau \quad (10)$$

Since $R_{h_{AB}}$ (t) is an autocorrelation function, $R_{h_{AB}}$ (t−$T_1$) is symmetric around the time axis (t=$T_1$) with a dominant peak value at the time instant $T_1$. This maximum value represents the signal energy $E_{h_{AB}}$ of the approximated channel impulse response. Because the received signal y(t) is the result of the convolution of a pulse signal e(t) and a timely compressed signal $R_{h_{AB}}$ (t−$T_1$), the energy of y(t) is successfully condensed in a short time window, thus mimicking the properties of a pulse wave. Note that if the transmitted time-reversed signal x(t) is intercepted at a sensor C whose position is different than sensor A, the received signal z(t) would be the result of a cross-correlation between the CIR $h_{AB}(t)$ and the CIR $h_{BC}(t)$, thus failing to receive a focused signal. Therefore, the back-propagating time-reversed signal transmitted at sensor B generates a spatially and temporally focused signal at sensor A only, limiting the interferences to adjacent sensors.

As described herein, pulse position modulation (PPM) encodes the data bit stream in a sequence of pulses by varying the time-position of each pulse according to the data symbol it carries. To do so, the time axis is divided into frames of same length; each frame corresponds to one data symbol. The duration of a frame is called the frame period and is the reciprocal of the symbol rate. For an M-ary PPM modulation scheme, each data symbol contains N=log$_2$ (M) bits and is represented by a time shift $\Delta t$ from the beginning of the corresponding frame. There are M possible time shifts $\Delta t_1, \Delta t_2, \ldots, \Delta t_M$, each time shift encodes a different data symbol.

PPM is also effective in RF environments prone to multipath propagation and high level of interferences. The dispersive and multimodal effects of the elastic channel are similar to that of multipath propagation of the RF channel. However, since the group and phase velocities of the elastic waves have different frequency-dependent values, the transmitted pulse within a PPM frame is received as a distorted and attenuated signal whose energy is substantially spread in time.

Therefore, the position of the received PPM signal is not easily detected in a direct-PPM-modulation scheme without compensating for the elastic channel dispersion and multimodal propagation. To address this, a modified implementation of PPM known as time-reversal-PPM (TR-PPM) is disclosed herein. The advantage of combining time-reversal with PPM is that the energy of each transmitted PPM frame can be focused in a narrow time-width for successful demodulation of the received frame.

Since the transmitted data symbols are encoded in the time-position of the modulated signal, a frame synchronization method is useful at the receiving sensor to estimate the start of the first TR-PPM frame. To do so, a preamble signal is appended at the beginning of the transmitted data. Considering an information exchange between two sensors A and B, B being the transmitter and A the receiver. The transmitted TR-PPM signal s(t) at sensor B is defined as $$s(t)=\Sigma_{i=0}^{i=L}x(t-iT_f-\Delta t_i) \quad (11)$$

where x(t) is the scaled TR received signal at sensor B from a transmitted excitation e(t) at sensor A as illustrated in Equation (6). L is the number of transmitted symbols, $T_f$ is the frame period, and $\Delta t_i$ is the time shift of the $i^{th}$ transmitted symbol. The preamble data corresponds to a zero-value symbol added on top of the L information bits (i=0). The corresponding received TR-PPM signal r(t) at sensor A is expressed as $$r(t)=s(t)*h_{AB}(t)+n(t)=\Sigma_{i=0}^{i=L}y(t-iT_f-\Delta t_i)+n(t) \quad (12)$$

where y(t) is the received TR-focused signal as defined in Equation (8), and n(t) is the additive noise. The received signal r(t) is then time-synchronized and demodulated to recover the transmitted bits. The time of arrival of the preamble is obtained by estimating the time instant $\hat{\tau}_0$ at which the first received peak value is reached. $\hat{\tau}_0$ corresponds to the lag between the received signal r(t) and the excitation signal e(t) defined as $$\hat{\tau}_0 = \underset{\tau \geq 0, first}{\mathrm{argmax}}\{R_{re}(\tau)\} \quad (13)$$

where $R_{re}(\tau)$ is the cross-correlated output of the matched filter whose template is e(t), $$R_{re}(\tau)=\int_0^{T_0}r(t-\tau)e(t)dt \quad (14)$$

After frame synchronization, a digital energy detector is used to determine the value of the transmitted symbol within each frame. For the $l^{th}$ received frame (l=1 ... L), the decision variables used by the energy detector are given by $$E_{l_i}=\int_{-T_0/2}^{T_0/2}r(t-\hat{\tau}_0-lT_f-\Delta t_i)dt, i=1 \ldots M \quad (15)$$

The detected symbol in the $l^{th}$ frame is the one with the maximum energy $E_{l_{max}}$ defined as $$E_{l_{max}} = \underset{i=1\ldots M}{\mathrm{argmax}}\{E_{l_i}\} \quad (16)$$

FIG. 4 shows M-ary time-reversal pulse position modulation and demodulation (M-TRPPM) procedure.

As shown in FIG. 4, an intended transmitter (Tx) node B 401 and an intended receiver (Rx) node A 402 are shown. As stated herein, the considerations of elastic wave propagation determine that the receiver node contacts the transmitter node as shown by Tx excitation 416, channel 414 and Rx excitation 404. Tx signal 406, Tx TR-PPM (transmitter, time-reversal pulse position modulation) signal 408, channel 412, Rx TR-PPM (receiver time-reversal pulse position modulation) signal 418, Tx data 410 and Rx data 420 are shown.

Signal modulation: M-ary time-reversal pulse position modulation (M-TRPPM) is now discussed.

Pulse position modulation (PPM) encodes the data bit stream in a sequence of pulses by varying the time-position of each pulse according to the data symbol it carries. To do so, the time axis is divided into frames of same length; each frame corresponds to one data symbol. The duration of a frame is called the frame period and is the reciprocal of the symbol rate, i.e., the number of transmitted data symbols per second. For an M-ary PPM modulation scheme, each data symbol contains log$_2$(M) bits and is represented by a time shift $\Delta t$ from the start of the corresponding frame. There are M possible time shifts $\{\Delta t_1, \Delta t_2, \ldots, \Delta t_M\}$ for the M possible data symbols $\{a_1, a_2, \ldots, a_M\}$.

Pulse position modulation (PPM) is effective in radio-frequency (RF) environments prone to multipath propagation and high level of interferences. The dispersive and multimodal effects of the elastic channel are similar to that of multipath propagation of the RF channel. However, since the group and phase velocities of the elastic waves have different frequency-dependent values, the transmitted pulse within a PPM frame is received as a distorted and attenuated signal whose energy is substantially spread in time. Therefore, the position of the received PPM signal cannot be detected in a direct-PPM-modulation scheme without compensating for the elastic channel dispersion and multimodal propagation.

This disclosure describes mitigation of these issues by using a modified implementation of direct PPM modulation called M-ary time-reversal-PPM (M-TRPPM) modulation. By the direct M-ary PPM, multiple bits are grouped into symbols. For example, M=2$^r$, where "r" is the number of bits per symbol. The advantage of combining the time-reversal principle with PPM modulation is that the spread energy of each transmitted M-ary PPM frame is focused in a narrow time window for successful demodulation of the received frame.

Since the transmitted data symbols are encoded in the time-position of the modulated signal, a frame synchronization method is used at the receiving sensor to estimate the start of the first M-TRPPM frame. A preamble signal is appended at the beginning of the transmitted data.

Consider an exchange of information between two sensors A 402 and B 401, B 401 being the transmitter and A 402 being the receiver. The preamble data corresponds to a zero value symbol added on top of the N information data symbols. The transmitted M-TRPPM signal s(t) from sensor B 401 is defined as $$s(t) = \sum_{k=0}^{k=N} v(t - kT_f - \Delta t_k) \qquad (17)$$

With $$\Delta t_k \in \{\Delta t_1, \Delta t_2, \ldots, \Delta t_M\}, 0 \leq \Delta t_k \leq T_f \qquad (18)$$

$T_f$ is the frame period, M is the number of possible data symbols, and $\Delta t_k$ is the time shift of the $k^{th}$ transmitted symbol. v(t) is the scaled time-reversal of the received excitation u(t) at sensor B 401 resulting from a transmitted excitation 416 p(t) of length $T_0$ at sensor A 402. The signals u(t) and v(t) are expressed as $$u(t) = \begin{cases} p(t) * h_{AB}(t), & 0 \leq t \leq T_1 \\ 0, & \text{otherwise} \end{cases} \qquad (19)$$

and $$v(t) = \begin{cases} \alpha p(-t + T_1) * h_{AB}(-t + T_1), & 0 \leq t \leq T_1 \\ 0, & \text{otherwise} \end{cases} \qquad (20)$$

where $h_{AB}$ (t) is the real-valued channel impulse response (CIR) between the sensors A 402 and B 401, and $T_1$ is the recording duration of the received excitation 404 u(t). α is the energy scaling factor that matches the energy of the received signal 404 u(t) to the energy of the excitation signal 416 p(t). The scaling factor α is defined as $$\alpha = \sqrt{\frac{\int_0^{T_0} p^2(t) dt}{\int_0^{T_0} u^2(t) dt}} \qquad (21)$$

The recording duration $T_1$ is chosen to be very large compared to the excitation signal length ($T_1 \gg T_0$) so as to capture the effect of signal dispersion and approximate the actual infinite channel CIR of dispersive elastic waveguides. Equation (19) illustrates that the information about the channel characteristics is embedded in the received signal through the CIR $h_{AB}$ (t).

The received M-TRPPM signal 418 r(t) at sensor A is expressed as $$r(t) = s(t) * h_{AB}(t) + n(t) = \sum_{k=0}^{k=N} q(t - kT_f - \Delta t_k) + n(t) \qquad (22)$$

where q(t) is the received time-reversed (TR) focused signal and n(t) is the additive noise. The elastic channel 412 is assumed to be spatially symmetric over the duration of the measurements due to reciprocity. Therefore, the channel 414 CIR $h_{AB}$ (t) from sensor A 402 to B 401 equals the channel 412 CIR $h_{BA}$(t) from sensor B 401 to A 402. Channel 412 may be the same channel as channel 414, but for ease of reference and discussion the channel, which may be a single channel, is illustrated as two channels 412, 414. The TR-focused signal q(t) is defined as $$q(t) = v(t) * h_{AB}(t) = \begin{cases} \alpha p(-t + T_1) * h_{AB}(-t + T_1) * h_{AB}(t), & 0 \leq t \leq T_2 \\ 0, & \text{otherwise} \end{cases} \qquad (23)$$

where $T_2$ is the recording duration of q(t) which is at least twice as long as $T_1$, $T_2 \geq 2 T_1$. For $0 \leq t \leq T_2$, q(t) is also expressed in the form $$q(t) = \alpha p(-t + T_1) * \mathcal{R}_{hh}(t - T_1) \qquad (24)$$

where $\mathcal{R}_{hh}(t)$ is the channel autocorrelation function between sensors A 402 and B 401 as defined as $$\mathcal{R}_{hh}(t) = h_{AB}(-t) * h_{AB}(t) = \int_{-\infty}^{+\infty} h_{AB}(\tau - t) h_{AB}(t) d\tau \qquad (25)$$

Since $\mathcal{R}_{hh}(t)$ is an autocorrelation function, $\mathcal{R}_{hh}(t-T_1)$ is symmetric about the line $t=T_1$, with a dominant peak value at the time instant $T_1$. This maximum value represents the signal energy $E_h$ of the approximate channel impulse response. Because the received signal q(t) is the result of the convolution of a pulse signal p(t) and the timely compressed signal $\mathcal{R}_{hh}(t-T_1)$, the energy of q(t) is successfully condensed in a narrow time window, thus mimicking the properties of a pulse wave. Note that if the transmitted time-reversed signal v(t) from sensor B 401 is intercepted at a sensor C whose location is different than sensor A 402, the received time-reversed signal w(t) would be the result of a cross-correlation between the CIR $h_{AB}$(t) and the CIR $h_{BC}$(t), thus failing to receive a highly focused signal. Therefore, the back-propagating time-reversed signal transmitted from sensor B 401 generates a spatially and temporally focused signal at sensor A 402 only, limiting the interferences to adjacent sensors.

The received signal 418 r(t) is then time-synchronized and demodulated to recover the transmitted bits. The time of arrival of the received preamble is obtained by estimating the time instant $\tau_0$ at which the first received peak value is reached. The estimate of the time of arrival $\hat{\tau}_0$ corresponds to the lag between the received signal r(t) and the excitation signal p(t) defined as $$\hat{\tau}_0 = \arg\max\{\mathcal{R}_{rp}(\tau)\}_{\tau = 0, first} \qquad (26)$$

where $\mathcal{R}_{rp}(\tau)$ is the cross-correlation output of the matched filter whose template is p(t), $$\mathcal{R}_{rp}(\tau) = r(-\tau) * p(\tau) = \int_0^{T_0} r(t - \tau) p(t) dt \qquad (27)$$

After time synchronization of the received signal frames, a digital energy detector is used to determine the value of the transmitted symbol within each frame. For the $k^{th}$ received frame (k=1 N), the decision variables $E_{k,j}, j=1 \ldots M$ used by the energy detector to recover the M possible data symbols $a_j \in \{a_1, a_2, \ldots, a_M\}$ are given by $$E_{k,j} = \int_{-\frac{T_0}{2}}^{\frac{T_0}{2}} r(t - \hat{\tau}_0 - kT_f - \Delta t_j) dt, \quad j = 1 \ldots M \qquad (28)$$

The detected symbol in the k' frame is the one with maximum energy $E_{k_{max}}, k=1 \ldots N$ as defined as $$E_{k_{max}} = \operatorname{argmax}\{E_{kj}\}_{j=1\ldots M} \quad (29)$$

Figure 5:
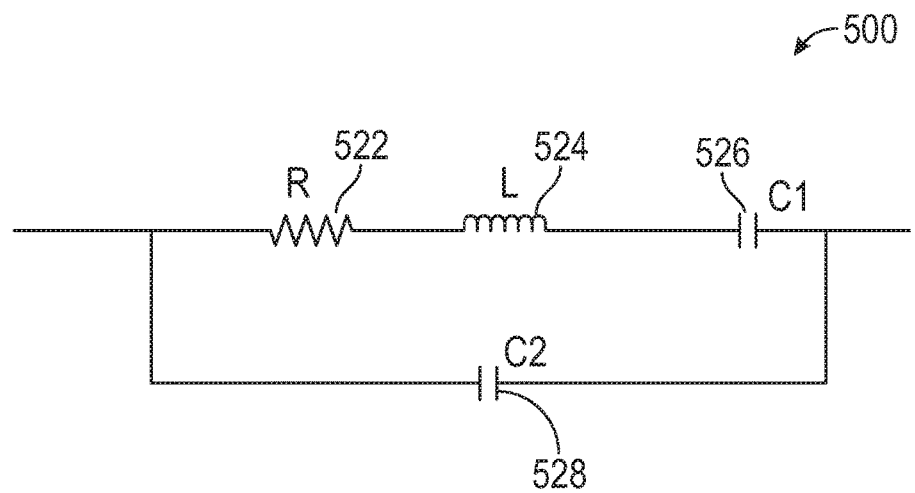
FIG. 5 shows an equivalent circuit of a piezoelectric transducer at resonance.

FIG. 5 shows an equivalent circuit 500 of a piezoelectric transducer at resonance.

A piezoelectric transducer is represented as a two-port RLC series and parallel resonant equivalent circuit 500, which models the electromechanical resonant and anti-resonant behavior of the transducer. This circuit 500 comprises resistor 522, inductor 524, capacitor 526 and capacitor 528.

To convert electrical signals into acoustic vibrations propagating on plate-like structures as elastic waves, or Lamb waves, a piezoelectric transducer such as the Lead Zirconate Titanate (PZT) transducer is employed. PZT transducers are bidirectional transducers that are able to operate either as an actuator or a sensor. When acting as an actuator, a PZT transducer generates an acoustic vibration upon excitation. When used as a sensor, the PZT transducer produces an electrical signal in response to an acoustic vibration.

Therefore, PZT sensors are active sensors that are well suited for the design of an automated wireless acoustic system. The capacity of a PZT sensor to convert an electrical signal into a mechanical energy and vice-versa is measured by its electromechanical coupling coefficient defined as $$k_{EM}^2 = \frac{\text{converted energy}}{\text{input energy}}. \quad (30)$$

When operating at its resonant frequency $f_r$, the piezoelectric conversion gain of the transducer is maximal. The anti-resonant frequency $f_a$ has the opposite effect. The frequencies $f_r$ and $f_a$ are expressed as $$f_r = \frac{1}{2\pi\sqrt{LC_1}} \text{ and } f_a = \frac{1}{2\pi\sqrt{LC_1C_2/(C_1+C_2)}} \quad (31)$$

Figure 6:
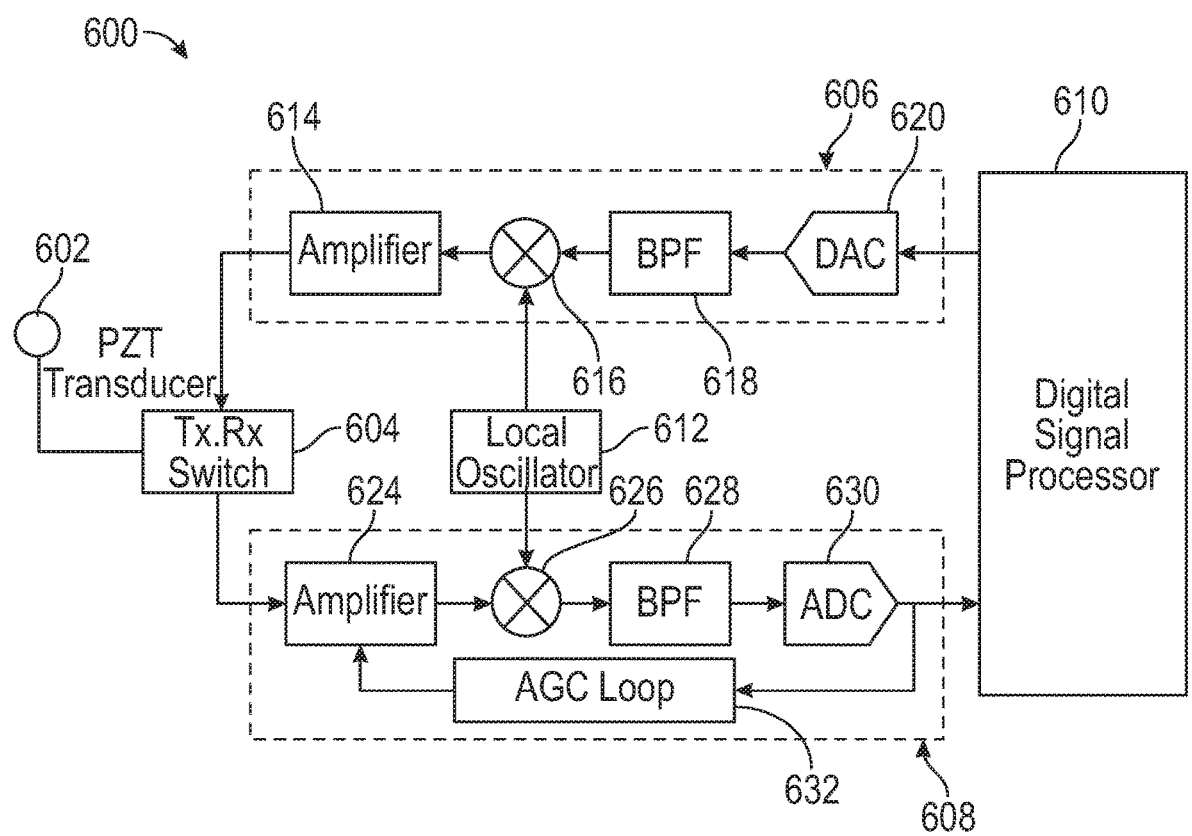
FIG. 6 shows a sensor node analog front end for acoustic wireless communication and SHM (structural health monitoring) sensing.

FIG. 6 shows a sensor node analog front end 600 for acoustic wireless communication and SHM sensing. The circuit 600 comprises PZT transducer, or sensor, 602, transmit/receive switch 604, actuation (transmitter) circuit 606, sensing (receiver) circuit 608, local oscillator (LO) 612 and DSP (digital signal processor) 610.

The actuation (transmitter) circuit 606 comprises DAC (digital to analog converter) module 620, BPF (band pass filter) 618, mixer circuit 616 and amplifier 614. The actuation circuit 606 receives input from DSP 610 and LO 612. The output from transmitter circuit 606 is provided to switch 604.

The sensing (receiver) circuit 608 comprises an amplifier 624, mixer circuit 626, BPF (band pas filter) 628, ADC (analog-to-digital converter) module 630, AGC (automatic gain control) loop 632. The sensing circuit 608 receives input from switch 604 and LO 612 and provides output to DSP 610.

In order to transmit and receive information at acoustic frequencies using elastic waves or Lamb waves, the sensor and/or sensor node is built as an analog transceiver front end. The analog front end 600 is composed of an actuation circuit 606, which is also used as the transmitter and a sensing circuit 608 which is also used as the receiver.

Both transmitter circuit 606 and receiver sensor node circuit 608 are typically connected to a single PZT transducer 602 through a transmit/receive (Tx/Rx) switch 604 that shifts between signal transmission and signal reception following a time division duplexing (TDD) scheme.

The transmitter circuit 606 comprises a digital-to-analog converter (DAC) 620, a band-pass filter (BPF) 618, a signal mixer 616 and amplifier 614. The DAC data converter 620 is used to convert the digital M-TRPPM modulated data and actuation samples into a baseband analog signal. The BPF 618 filters out the analog signal ripples after data conversion. The mixer 616 shifts the baseband analog signal frequency to the desired frequency for transmission. The mixer 616 also multiplies the baseband signal with the transceiver local oscillator (LO) 612 output. The resulting signal is then amplified by amplifier 614 and converted to an acoustic signal by the PZT transducer 602.

The receiver circuit 608 is the dual of the transmitter circuit 606 as the circuits 608, 606 may have similar components but the receiver circuit 608 performs a receiving function and the transmitter circuit 606 performs a transmitting function. The receiver circuit 608 comprises a signal amplifier 624, a mixer circuit 626, a band-pass filter (BPF) 628, an ADC (analog-to-digital) converter 630, and an automatic gain control (AGC) loop 632. The signal amplifier 624 is used to amplify the highly attenuated received signal after dispersive propagation on the solid media. The signal mixer circuit 626 shifts the received signal frequency to the baseband domain. The BPF filter 628 maintains the useful signal within the desired baseband signal bandwidth. The AGC loop 632 operates as a feedback loop between the baseband signal and the receiver 608 input. The AGC loop 632 adjusts the amplifier gain in order to obtain the same, or similar, baseband signal maximum amplitude independently of the received signal amplitude variations. The ADC converter 630 transforms the received analog signal into digital samples that are fed to the digital signal processor 610 for processing and storage.

Figure 7:
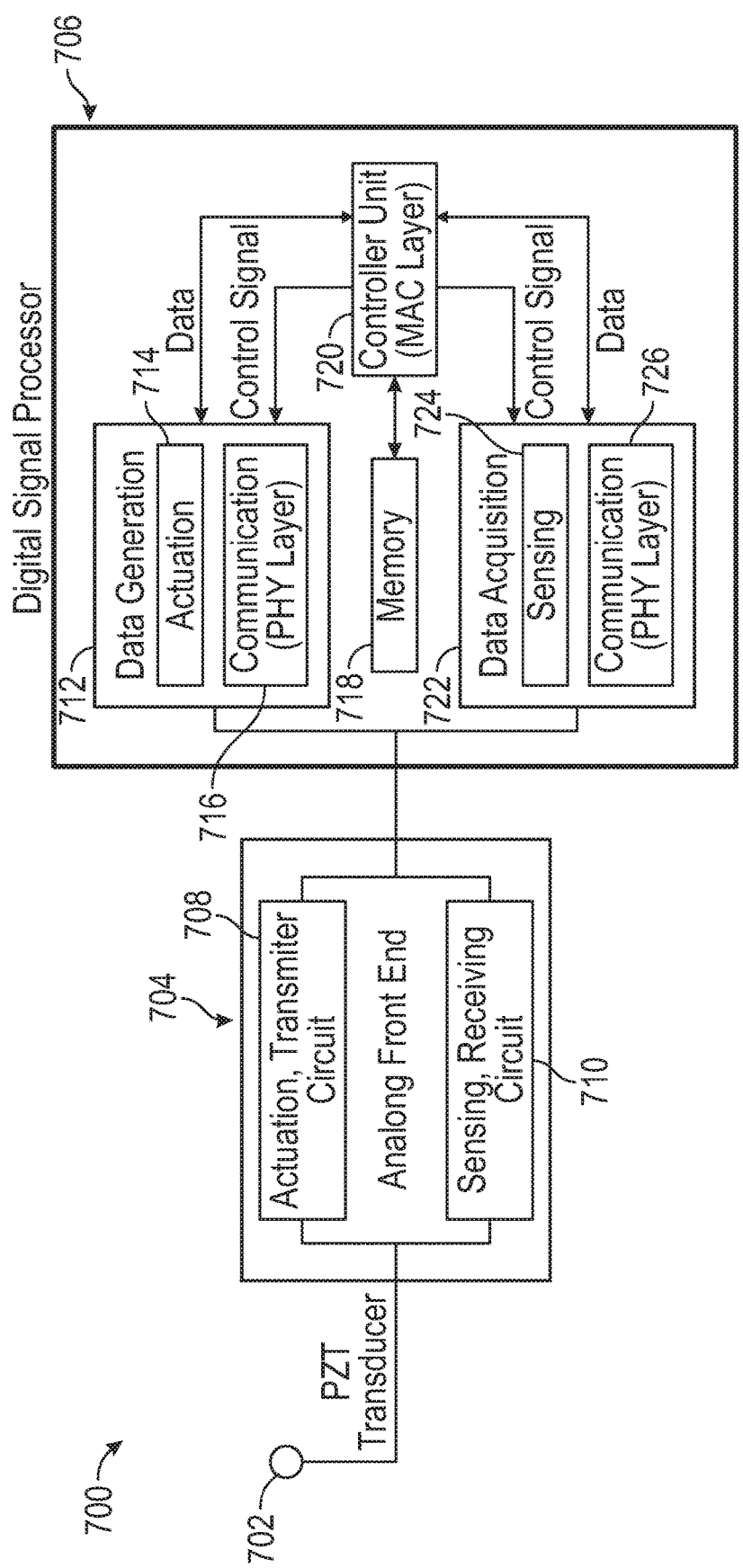
FIG. 7 shows a sensor node baseband digital signal processor for acoustic wireless communication and SHM sensing.

FIG. 7 shows a circuit 700 that comprises sensor node baseband digital signal processor (DSP) 706 for acoustic wireless communication and structural health monitoring (SHM) sensing. FIG. 7 shows PZT transducer 702, analog front end 704 and DSP 706.

The analog front end 704 comprises actuation (transmitter) circuit 708 and sensing (receiver) circuit 710. Similar circuits are described in relation to FIG. 6 herein.

DSP circuit 706 comprises data generation circuit 712, memory 718, controller unit 720 and data acquisition circuit 722.

The data generation circuit 712 comprises actuation circuit 714 and communication circuit, physical layer 716.

The memory unit 718 is any suitable electronic storage medium or electronic memory, which is in bi-directional communication with controller unit 720.

Controller unit 720 is typically a MAC layer, as described herein.

Data acquisition circuit 722 comprises sensing circuit 724 and communication circuit, typically physical layer 726.

Control signals are provided from controller unit 720 to data generation circuit 712 and from controller unit 720 to data acquisition circuit 722. Data signals are bi-directional between the controller unit 720 and the data generation circuit 712 and data acquisition circuit 722.

The digital signal processor (DSP) 706 is used for data generation (712), data acquisition (722), and control (720). The DSP 706 is programmed with the AWSN network algorithms, or other suitable sensor algorithms and controls the operation of each sensor and/or sensor node 704.

The DSP 706 decodes the instructions received by the AWSN sink node (controller, coordinator) and configures the sensor and/or sensor nodes 704 for either wireless data transmission and reception or structure actuation and sensing for detection, for example, damage detection.

Figure 8:
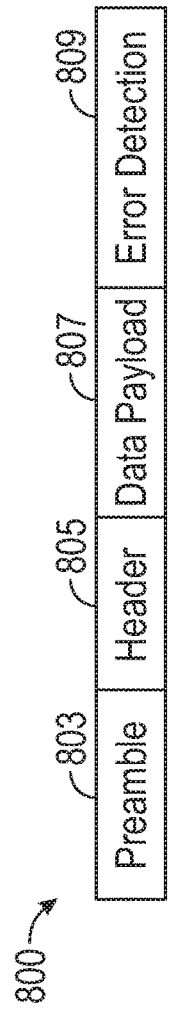
FIG. 8 shows a frame format for TR-STS (time-reversal sensor-to-sensor) communication at the MAC (media access control) layer.

FIG. 8 shows a frame format 800 for TR-STS (time-reversal sensor-to-sensor) communication at the MAC (media access control) layer. The format shows preamble portion 803, header portion 805, data payload portion 807 and error detection portion 809.

The information exchanged between sensors is encoded in a sequence of bits to be sent across the channel. Because the examined structure is a dispersive medium, the propagation of a short transmitted signal takes a long time. To avoid monopolizing the channel by a single sensor, the transmitted bit stream is divided into several packets of very small length called frames, thus allowing all sensors to access the channel more frequently. These frames are then transferred in different subsequent communication sessions.

The format of a transmitted frame is described in FIG. 8. A preamble 803 is joined at the beginning of the frame for M-TR-PPM (M-ary TR-PPM) synchronization at the receiver. The frame header 805 contains the addresses of the source and destination sensors for verification purposes at the receiving sensor. The data payload 807 includes the information about damage detection at the transmitting sensor. A cyclic redundancy check (CRC) code 809 is appended at the end of the frame for bit error detection at the receiving sensor.

The MAC (media access control) layer, as described herein, is responsible for dividing the data bit stream into a sequence of data frames of shorter length. The format of a transmitted frame is described in FIG. 8. A preamble 803 is added at the beginning of the frame for M-TRPPM synchronization at the receiver. The frame header 805 contains the addresses of the source and destination sensor nodes for verification purposes at the receiving sensor. The data payload 807 includes the information about damage detection at the transmitting sensor. A cyclic redundancy check (CRC) code 809 may be appended at the end of each frame for bit error detection at the receiving sensor.

The combination of the frame header 805, data payload 807, and error detection bits 809 forms the data codeword. CRC is a reliable technique to detect the presence of errors in the received frame. The CRC code is obtained by using a generator polynomial common to the source and destination sensor nodes. The transmitted codeword is a multiple of the CRC generator. Bit errors are detected at the receiving sensor by checking if the received codeword is also a multiple of the CRC generator. To increase the probability of error detection, the CRC generator is selected to detect the pattern of errors associated to the transmission of M-TRPPM modulated data across the elastic channel under test.

Figure 9:
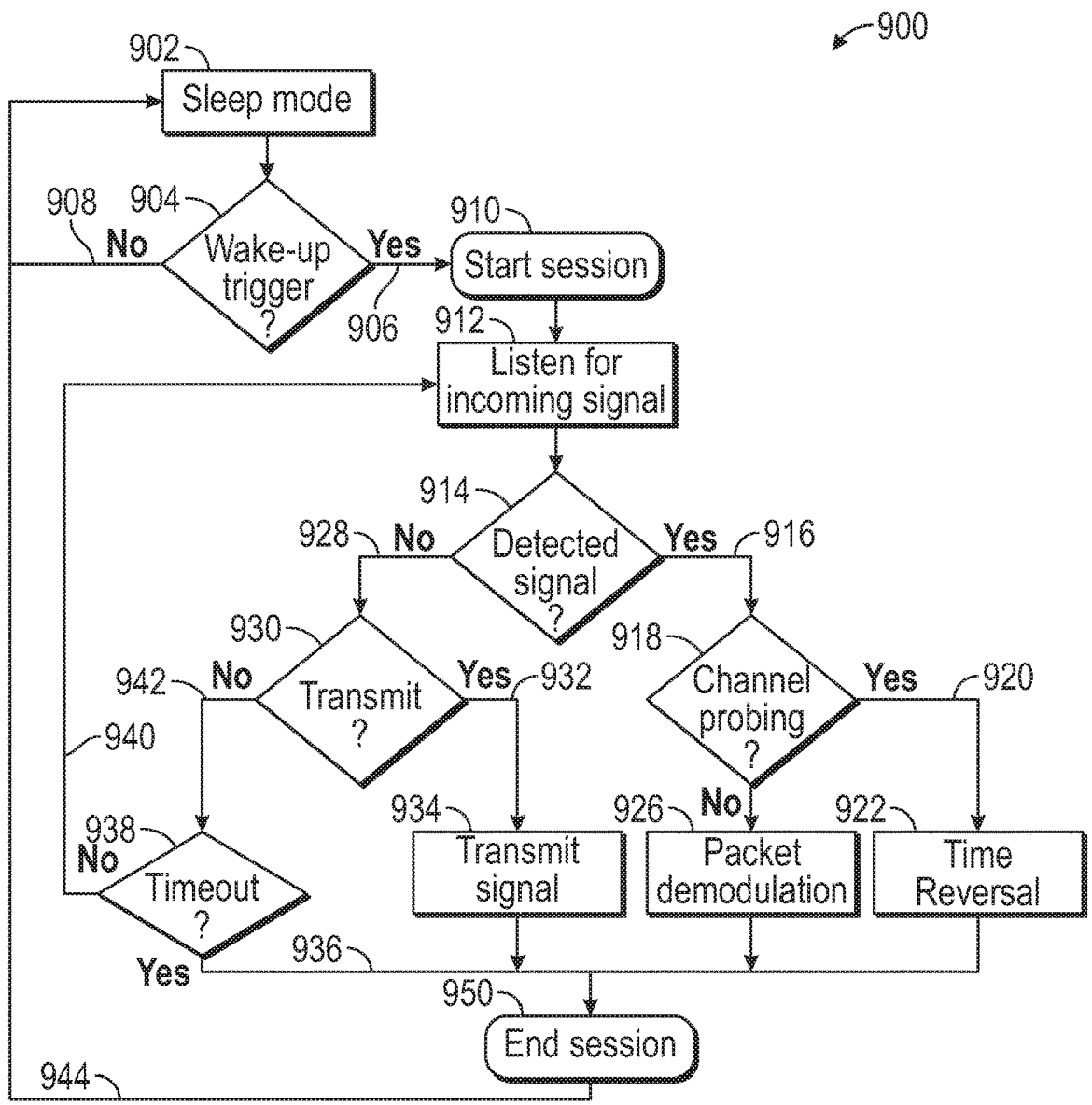
FIG. 9 shows a series of steps of TR-STS (time-reversal sensor-to-sensor) communication procedure.

FIG. 9 shows a series of steps 900 of TR-STS (time-reversal sensor-to-sensor) communication at the MAC (media access control) procedure. This may be used to establish a communication link between acoustic sensor nodes to transmit and receive data across the structure.

SHM applications have the unique characteristic of big data transmission and very long communication duration. In a traditional configuration, the detection of structural damages is performed in two phases. During the first phase, the sensors transmit their collected data to a centralized coordinator. At the second phase, the coordinator runs damage detection algorithms using the gathered data as inputs in order to reveal the presence of potential damages on the examined structure. To extend the lifetime of the wireless sensors mounted on the structure, the sensors described herein are configured to be in a sleep mode by default. They are triggered when the coordinator needs to examine the structure on an event basis—for example, after passing through a turbulence zone, or a schedule basis—at predetermined time intervals. The communication link is configured in a half-duplex mode where a sensor does not send and receive data frames simultaneously. The procedure followed by each sensor to transmit and receive data across the structure is tailored to meet the above-mentioned specifications.

FIG. 9 describes a channel access procedure in a point-to-point (sensor-to-sensor) configuration. Before engaging a communication session, the sensor is triggered by a wake-up signal from the processor. When acting as a transmitting node, the sensor first listens for the presence of propagating signals in its communication range. If the channel is clear, the sensor then sends the data to avoid interferences. When configured as a receiving node, the sensor also listens for incoming signals first. If the received signal is the result of channel probing, the sensor time-reversed it and save it for posterior M-ary TR-PPM (M-TR-PPM) communication. If the received signal is a M-ary TR-PPM (M-TR-PPM) modulated data, the sensor demodulates it in order to retrieve the transmitted information.

The steps of FIG. 9 may be stored on any suitable electronic medium, such as ROM, EEPROM or other non-transitory computer readable medium. The steps 900 of FIG. 9 illustrate the time-reversal sensor-to-sensor (TR-STS) communication procedure.

The steps begin with a sleep mode (902) and a determination is made whether there is a wake-up trigger (904). If so, "yes" (906) shows the session starts (910) by listening for an incoming signal (912). If there is no wake-up trigger (908), sleep mode (902) is maintained.

A determination is made whether a signal is detected (914). If so, "yes" (916) shows that a determination is made whether to channel probe (918). If so, "yes" (920) shows that time reversal is performed (922).

When there is not channel probing (918), "no" (924) shows that packet demodulation is performed (926).

Referring back to the detection of a signal (914), if no signal is detected (928), a determination is made whether to transmit (930). If so, "yes" (932) shows that the signal is transmitted (934).

When there is no transmission (942), a determination is made whether timeout has occurred (938). If not, "no" (940) shows that the listening for an incoming signal (912) occurs.

If timeout has occurred, "yes" (936) shows the process ends (950).

The process ends (950) following time reversal (922), packet demodulation (926) and transmit signal (934).

After the process ends (950), sleep mode (902) is entered (944).

As stated previously, prior to engaging a communication session, the sensor is triggered by a wake-up signal (904) from the on-board processor of the sensor.

When acting as a transmitting node, the sensor first listens for the presence of propagating signals (912) in its communication range. If the channel is clear, the sensor sends the data to avoid interferences.

When configured as a receiving node, the sensor also listens for incoming signals (912) first. If the received signal is the result of channel probing (918), the sensor time-reverses it (922) and saves it for posterior M-TRPPM communication. If the received signal is an M-TRPPM modulated data, the sensor demodulates it (926) in order to retrieve the transmitted information data.

Figure 10:
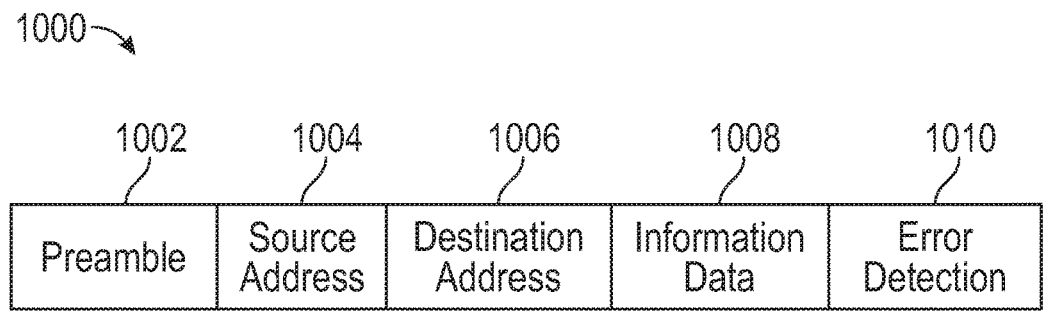
FIG. 10 shows a frame format for TR-TDMA (time-reversal time division multiple access) communication at the MAC (media access control) layer.

FIG. 10 shows a typical frame format 1000 for TR-TDMA (time-reversal time division multiple access) communication at the MAC layer. This format 1000 includes preamble 1002, source address 1004, destination address 1006, information data 1008 and error detection 1010. This format 1000 may be utilized for a transmitted frame for multi-sensor communication.

As shown, there are four types of data frames being exchanged: the wake-up frame (preamble 1002); the channel probing frame for time-reversal (source address 1004); the sensor control frame destination address (1006); and the information data frame 1008). Error detection frame 1010 is also shown.

The channel can either be divided in time domain, frequency domain, or time and frequency domain using orthogonal codes to encode the information and thereby deterministically share the channel among multiple sensors to avoid collisions, which occur when two or more sensors access the channel simultaneously.

Time division multiple access (TDMA) is a medium sharing technique by which network sensor nodes are assigned a time slot when the network sensor node can use the channel to transmit and receive information. A protocol is introduced herein to share the channel among multiple sensors, which is named herein as time-reversal time division multiple access (TR-TDMA).

Because communication at the physical layer is performed using the time-reversal principle in order to recover from the extremely dispersive propagation of Lamb waves on plates and plate-like structures, any type of data transmission across the structure is performed in two phases, namely the channel probing phase (FIG. 9, element 918) and the data transmission phase (FIG. 9, element 930). TR-TDMA is a collision-free deterministic multiple access mechanism built on top of a TDMA scheme to be compatible with the two-step active time-reversal based M-TRPPM modulation used at the physical layer.

There are two main types of data communication exchange scenarios in the developed sensor network: (1) a control data exchange from the network sink module or sink node also called network controller to the sensor and/or sensor nodes; and (2) a damage indication data exchange from the sensor and/or sensor nodes to the sink node, or controller, or coordinator.

FIG. 11 shows one embodiment 1100 of TR-TDMA scheduling round. As shown in FIG. 11, the scheduling round has start of frame 1102, probing (sensor-controller) 1104, control signals (controller-sensor) 1106, probing (controller-sensor) 1108, damage information (sensor-controller) 1110, "x" times 1112 and end of frame 1114.

FIGS. 12A and 12B show downstream control signal transmission during network initialization. As shown, each data exchange is preceded by a channel probing phase.

FIG. 12A shows phase 1 channel probing 1200 from sensor nodes to a controller (sink). Controller "0" is shown as 1202 and sensors 1, 2, 3 . . . N, are shown as elements 1204, 1206, 1208 and 1210, respectively. The number of sensors and/or sensor nodes "N" (generally sensors) may be any suitable number. The sensors 1 . . . N provide data to controller 1202. Sensor 1204 is shown as "1" and identified as $t_1 = t_{init} + t_{pd}$. Sensor 1206 is shown as "2" and identified as $t_2 = t_{init} + 2t_{pd}$. Sensor 1208 is shown as "3" and identified as $t_3 = t_{init} + 3t_{pd}$. Sensor 1210 is shown as "N" and identified as $t_N = t_{init} + Nt_{pd}$.

FIG. 12B shows phase 2 control data transmission 1201 from controller, or sink, to sensor nodes. The controller "0" is shown as 1203. Sensor "1", 1205, sensor "2", 1207, sensor "3", 1209 and sensor N (where "N" is any suitable number) 1211 are shown.

FIG. 12B shows that in a downstream scenario, control data is exchanged from a sink node (controller) 1203 to one or more sensor nodes 1 . . . N, 1205, 1207, 1209 and 1211, respectively. While four nodes are depicted, any number of sensors and/or sensor nodes may be used. One embodiment described herein is that the sensor control data is transmitted from the sink node, or controller 1203 to the sensor nodes 1205, 1207, 1209, 1211, at startup (after power on) or after a reset of the network. Control signals are sent out to configure the sensor nodes 1205, 1207, 1209, 1211, for example, to broadcast the total number of sensors active in the network, the length of a time-slot, or the schedule of a TR-TDMA schedule round.

It can be assumed that after startup, the processor clocks of each sensor node 1205, 1207, 1209, 1211 are synchronized to the time reference "0" and configured to a substantially identical default frequency $f_{clk}$. One embodiment described herein is that there is no direct communication from the sink node (1202, 1203) to the sensor nodes (1 . . . N) without first probing the channel from the sensor nodes (1 . . . N).

To cope with this, assuming that the network contains N different sensors in addition to the network sink, or controller, the channel is probed from the sensors to the sink as follows: (1) all sensors clock are at "0" after startup or reset and are initialized at the same time $t_{init}$; (2) each sensor is assigned a sensor number from 1 to N; (where "N" is any suitable number); (3) when initially deploying the sensors on the structure, the maximum propagation delay $t_{pd_{max}}$ is measured between the farthest sensor and the sink node and programmed into each sensor node; (4) before sending a sensor's probing signal to the sink, each sensor observes a backoff time $t_{bck_n}$ that equals its sensor number multiplied by the maximum propagation delay: $t_{bck_n} = n * t_{pd_{max}}$. Therefore, the sink node receives N probing signals from the N sensor nodes.

Taking advantage of the spatial focusing of the time-reversal principle, while all sensor nodes remain ON to receive the control information that will allow them to derive the instructed TR-TDMA schedule, the sink node "0" successively transmits the control signals to each sensor using their individual time-reversed probing signals. Since the time-reversal focusing will occur at the spatial location of the destined sensor node, there is an inherent spatial multiplexing of the transmitted signal which prevents interferences between transmitted signals and allow for simultaneous transmission of the control data.

FIGS. 13A and 13B show phase 1 1310 and phase 2 1311 upstream channel probing (FIG. 13A) and data transmission (FIG. 13B). These figures summarize the steps for data transmission in the upstream link from sensor nodes to the sink node.

The upstream embodiment shows that data is collected from sensor nodes 1314, 1316, 1318 and 1320 and provided to sink node (controller) 1312. FIG. 13A shows controller "0" 1312 and sensor nods 1 . . . N, elements 1314, 1316, 1318 and 1320, respectively, where "N" is any suitable number. FIG. 13B shows controller 1313, sensor 1 $t_1$, 1315, sensor 2 $t_2$, 1317, sensor 3 $t_3$, 1319 and sensor N $t_N$, 1321.

The collected data transmission from the sensor nodes 1 ... N to the sink node, (controller) 1312 "0" operates in a similar fashion to the downstream transmission. First, the sink node (controller) 1312 sends a probing signal which is recorded and time-reversed at each sensor node 1 ... N. Then, each sensor 1 ... N communicates with the sink node using M-TRPPM modulation over its allocated time slot.

FIG. 14 shows a measurement apparatus according to an embodiment. The apparatus comprises the waveform generator, signal digitizers and embedded controller are assembled on the National Instruments (NI) PXI platform. The measurement equipment used to experimentally validate the disclosed acoustic time-reversal based communication system using Lamb waves consists of an arbitrary waveform generator, two signal digitizers for data acquisition, and an embedded controller operating as the digital signal processor per network node. A linear amplifier is connected to the waveform generator to amplify the emitted acoustic signal.

Figure 15:
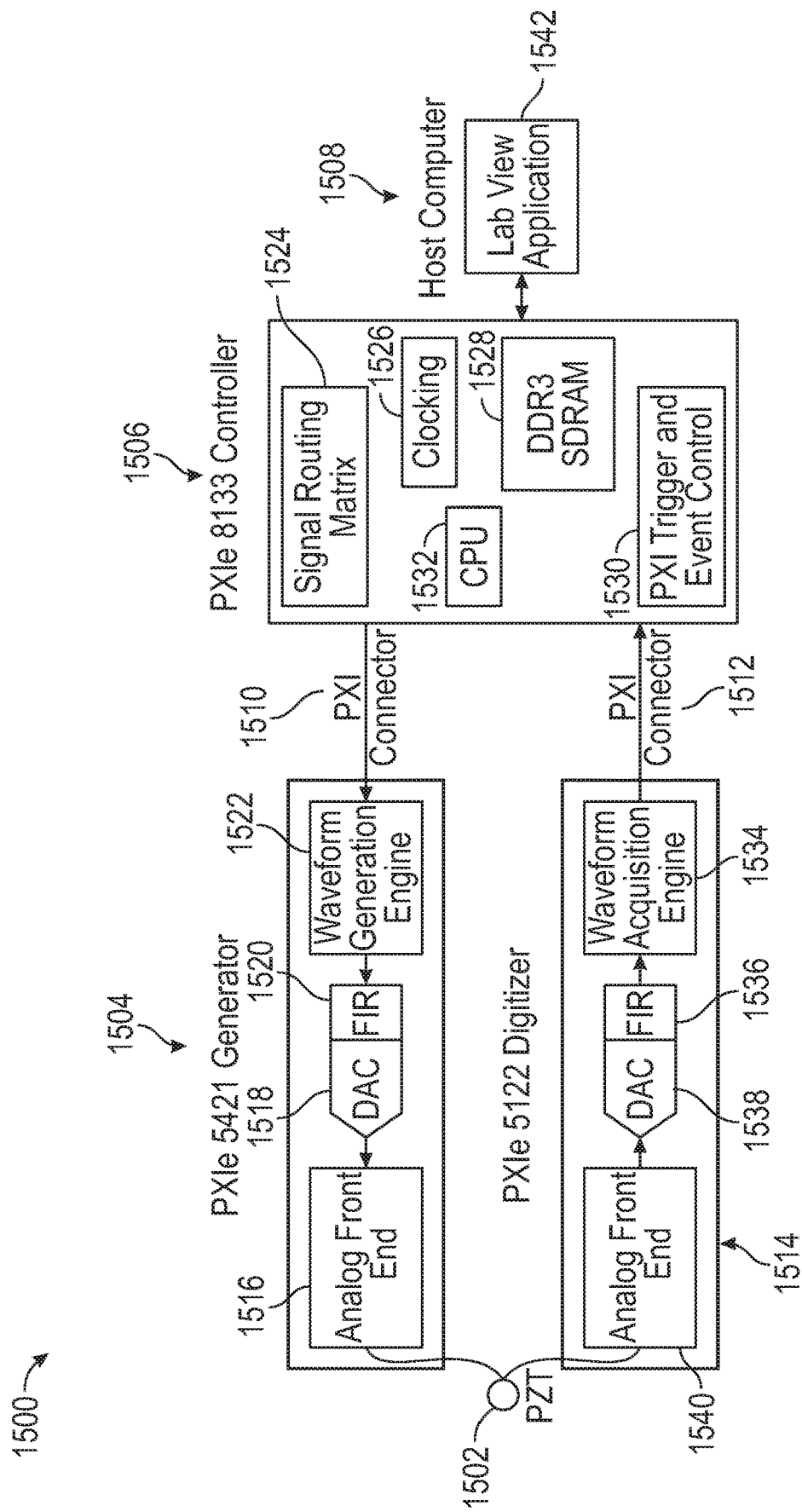
FIG. 15 shows a sensor hardware testbed.

FIG. 15 shows a sensor hardware testbed 1500. This includes a PZT transducer 1502, generator circuit 1504, a digitizer circuit 1514, connector 1512, controller circuit 1506, host computer 1508 and connector 1510.

Generator circuit 1504 may be a PXIe 5421 generator and includes an analog front end 1516, DAC 1518, FIR 1520 and waveform generation engine 1522.

Digitizer circuit 1514 may be a PXIe 5122 digitizer and includes analog front end 1540, ADC 1538, FIR 1536, wave acquisition engine 1534. The output from digitizer circuit 1514 is provided to controller circuit 1506 via connector 1512, which may be a PXI connector.

Controller circuit 1506 may be a PXIe 8133 controller and includes a CPU (central processing unit) 1532, signal routing matrix 1524, clock 1526, DDR3 SDRAM 1528 and PXI trigger and event control module 1530.

Host computer 1508 is operatively coupled to controller 1506 and includes an application, such as LabVIEW™ 1542. The connector 1510 provides input to generator circuit 1504. The connector 1510 may be a PXI connector.

As stated above, the waveform generator 1504 is an NI PXIe 5421 generator chip from National Instruments (NI). The testbed comprises a baseband waveform generation engine 1522, a digital finite impulse response (FIR) filter 1520, a digital-to-analog converter (DAC) 1518 and the analog front end 1516.

The signal digitizer 1514 is an NI PXIe 5122 digitizer chip made of an analog front-end 1540, an analog-to-digital converter (ADC) 1538, an FIR filter 1536, and a wave acquisition engine 1534. The signal generator 1504 and digitizer 1514 are operatively coupled to the NI PXIe 8133 controller 1506 embedded controller chip via two PXI connectors 1510, 1512. The controller 1506 supports the LabVIEW™ application software that controls the operation of each sensor mounted on the monitored structure.

The test set-up included a Lead Zirconate Titanate (PZT) piezoelectric sensor 1502 that acts as either an actuator or a sensor. The PZT active sensor 1502 was the SMD07T02R412WL piezoelectric ceramic disc from STEMINC. It is composed of the SM-412 piezo material and has a resonant frequency of 300 kHz and a resonant impedance of less than 10Ω. The parameters of the PZT transducer used are summarized in Table 1.

TABLE 1

| PZT sensor disc parameters | |
|---|---|
| Parameter | Value |
| Resonant frequency | 300 kHz ± 10 kHz |
| Resonant impedance | ≤10 Ω |
| Electromechanical coupling coefficient | ≥0.55 |
| Static capacitance | 3 nF (at 1 kHz, 1 Vrms) |
| Vibration mode | Radial mode |
| Dimensions | Diameter: 7 mm |
| | Thickness: 0.2 mm |

Table 2 summarizes physical and mechanical specifications of an aluminum plate under test, which is a square homogeneous aluminum plate with no damage and measures 36 inches per side and 0.16 inch in thickness.

TABLE 2

| Physical and mechanical parameters of the aluminum plate specimen under test | |
|---|---|
| Parameter | Value |
| Material | Aluminum (6061-T651 alloy) |
| Mass density | 2700 kg/m³ |
| Young's modulus of elasticity | 68.9 GPa |
| Poisson's ratio | 0.33 |
| Dimensions | Length × width: 36 × 36 inches |
| | Thickness: 0.16 inch |

Figure 16:
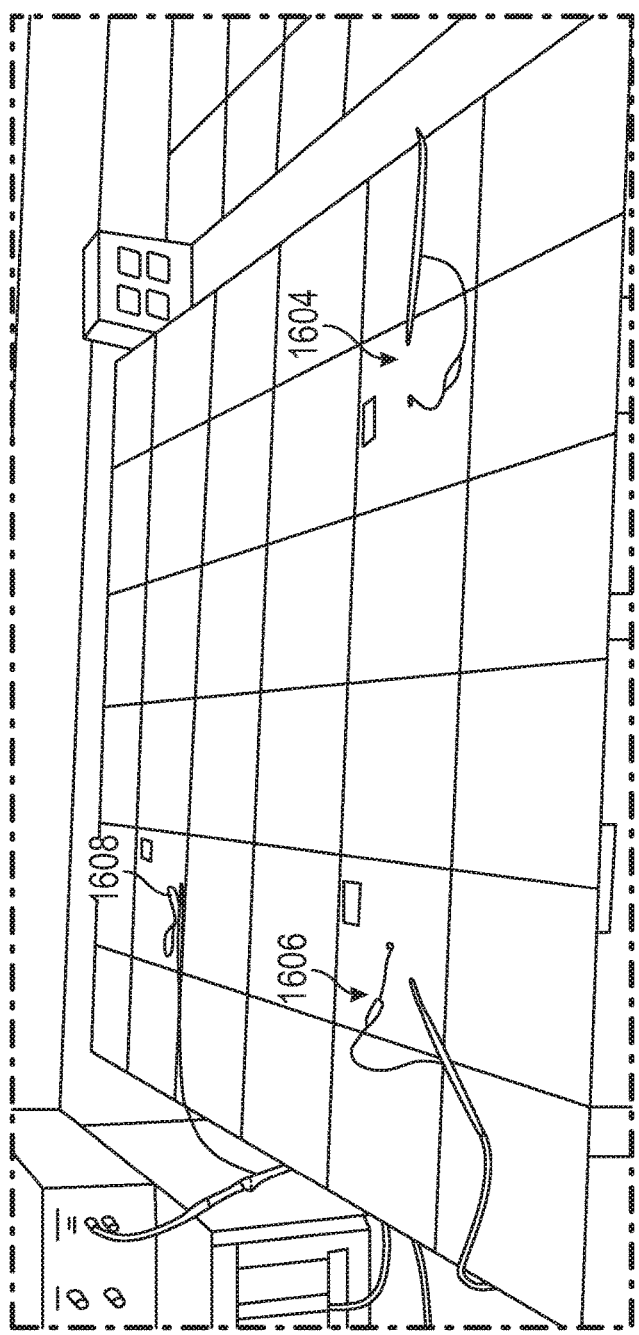
FIG. 16 shows a specimen under test.

FIG. 16 shows a specimen under test. To evaluate the time-reversal sensor-to-sensor and multi-sensor communication capability of the disclosed system, three sensors A 1604, B 1606, and C 1608 are mounted on the plates as shown in FIG. 16. Sensor A 1604 represents the sink node and sensor B 1606 and sensor C 1608 represent the sensor nodes. Sensors A 1604 and B 1606 are located 18 inches apart while sensors A 1604 and C 1608 are located 25.5 inches away from each other. The communication parameters at the physical layer are listed in Table 3 for a binary-TRPPM (2-TRPPM) modulation scheme at a default data rate of 1 kbps.

TABLE 3

| Communication parameters on the aluminum plate specimen | |
|---|---|
| Parameter | Value |
| Modulation | 2-TRPPM |
| # Tx bits | 1000 |
| Data rate | 1 kbps |
| Pulse duration | 4 ms |
| Excitation frequency | 300 kHz |
| Tx Amplitude | 40 Vpp |
| d(Tx-Rx) | A-B: 18" (45.72 cm) |
| | A-C: 25.5" (64.77 cm) |
| Rx sensitivity | 40 mVpp |

Figure 17:
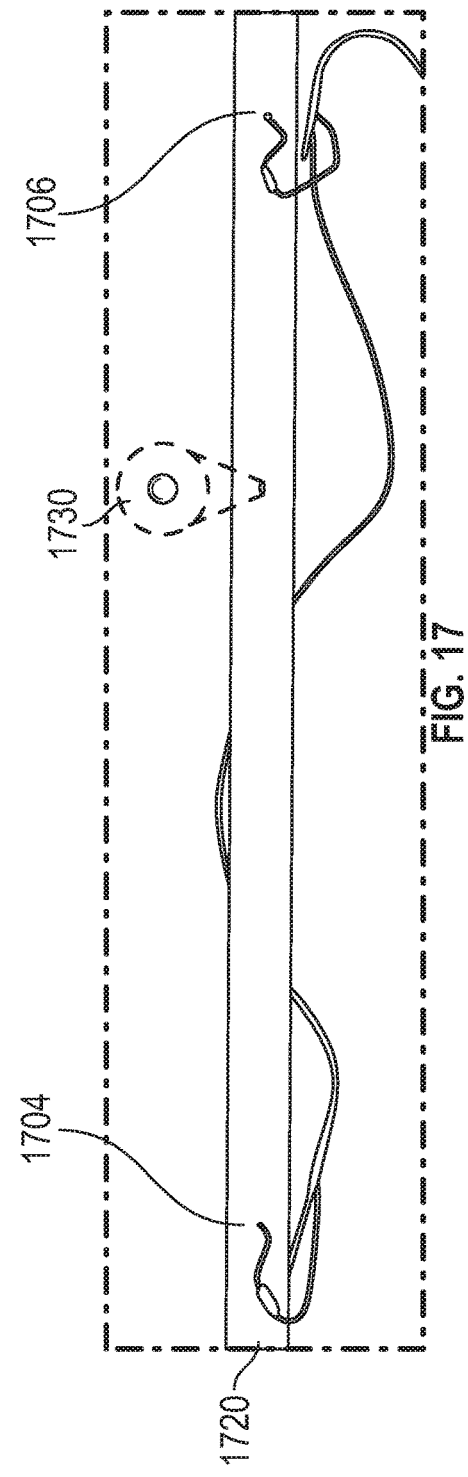
FIG. 17 shows an aluminum bar specimen with artificial hole damage.

FIG. 17 shows an aluminum bar specimen 1720 with artificial hole damage.

The hole 1730 measures 0.4 inch in diameter and 0.25 inch in depth. To examine the performance of the disclosed acoustic communication in presence of a damage, i.e., a hole 1730 is drilled on a homogeneous aluminum bar 1720 that is 60 inches long, 1 inch wide, and 0.5 inch thick. Sensor 1704 and sensor 1706 are also shown.

Figure 18:
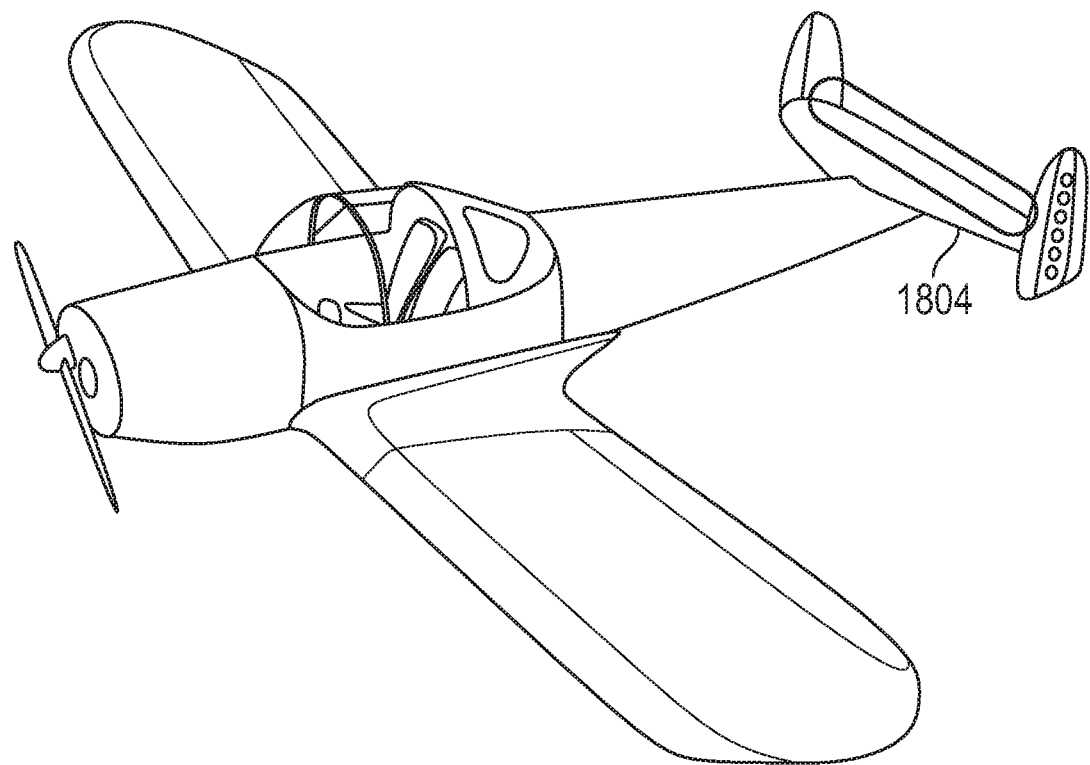
FIG. 18 shows an elevator part of an airplane under test.
Figure 19:
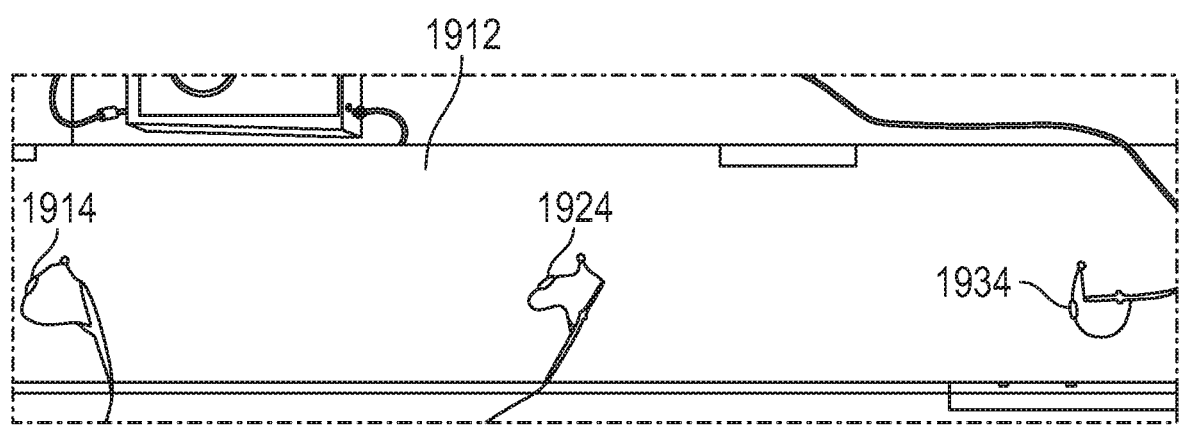
FIG. 19 shows an aluminum elevator specimen in a tapered-plate structure.

To represent a more realistic aerostructure, experiments were also conducted on the elevator part of the Ercoupe™ 415-C airplane horizontal stabilizer as illustrated in FIG. 18 and FIG. 19.

FIG. 18 shows an elevator part 1804 under test of the airplane Ercoupe™ 415-C made of aluminum.

FIG. 19 shows an aluminum elevator specimen in a tapered-plate structure. Note that the aluminum structure is covered by a layer of coating (or paint).

The elevator part 1912 has a tapered-plate structure that is 90 inches long, 13 inches wide, and 0.0625 inch thick. The aluminum elevator part is covered by a layer of coating (or paint). The communication parameters on the elevator specimen are summarized in Table 4. Sensors 1914, 1924 and 1934 are shown.

TABLE 4

Communication parameters on the airplane part specimen

| Parameter | Value |
|---|---|
| Modulation | 2-TRPPM |
| # Tx bits | 1000 |
| Data rate | 1-20 kbps |
| Pulse duration | 1 ms |
| d(Tx-Rx) | 60" (1.524 m) |
| Specimen's thickness | 0.0625" |

FIGS. 20A-F show graphs of excitation signal comparison between a rectangular windowed toneburst and a Gaussian modulated toneburst. The results are of an experimental examination of the performance of two 4-cycle toneburst signals, the first one with a rectangular window and the second with a Gaussian window.

Figure 20B:
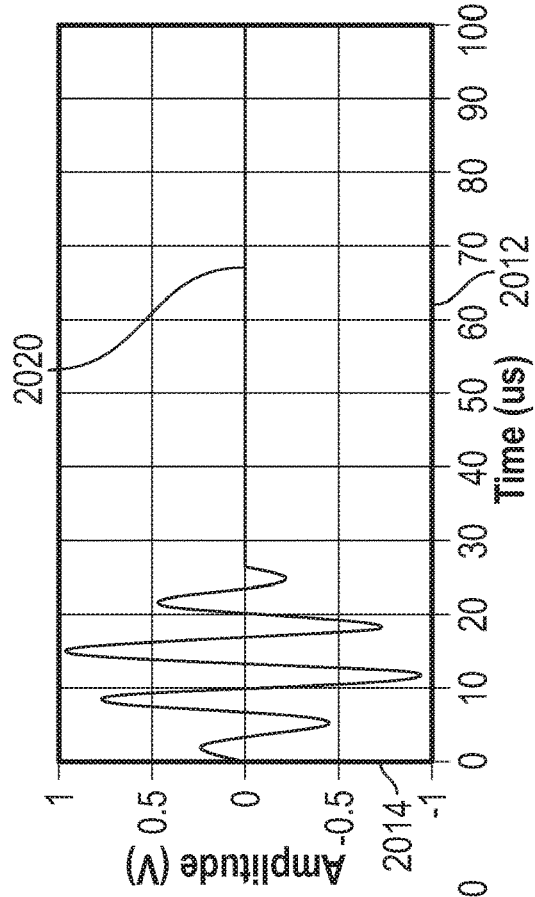
Figure 20D:
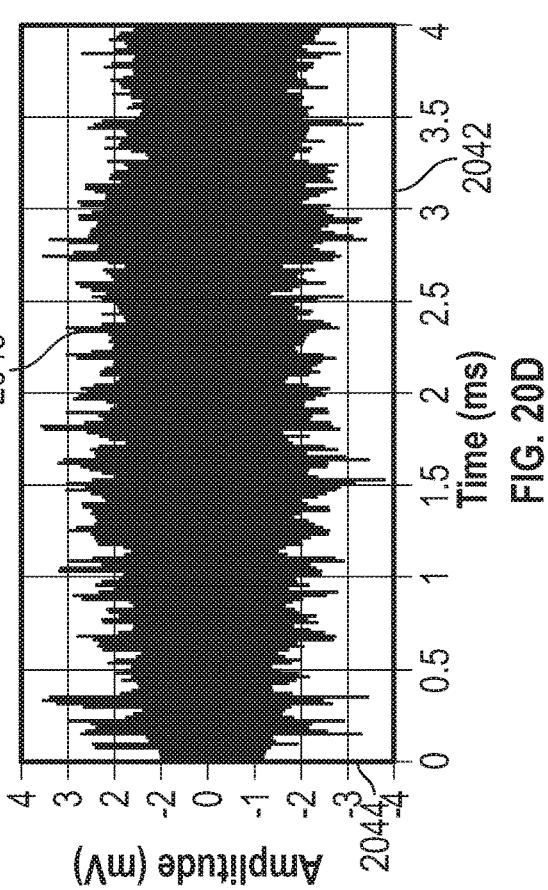
Figure 20A:
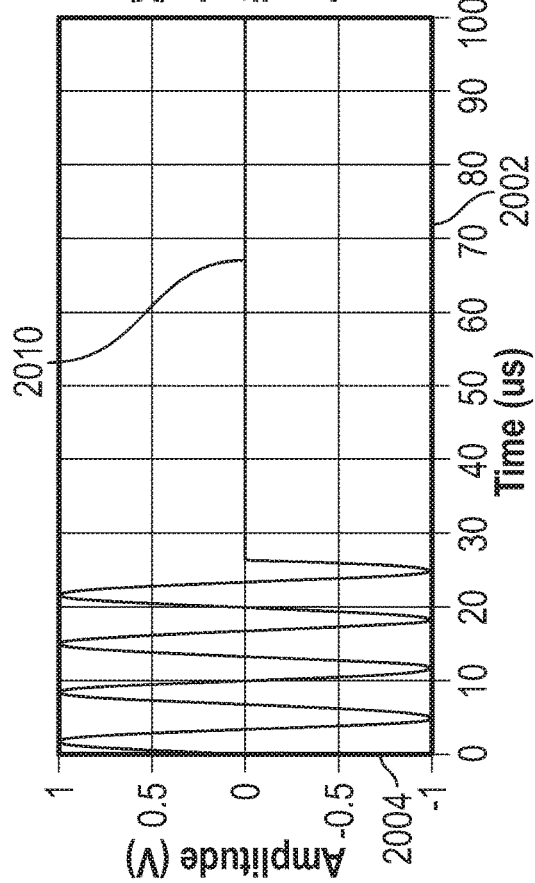

FIG. 20A shows a representation of a rectangular toneburst excitation. The plot 2010 is plotted on x-axis 2002 of time in microseconds and y-axis 2004 of amplitude in volts.

FIG. 20B shows a representation of a Gaussian modulated toneburst excitation. The plot 2020 is plotted on x-axis 2012 of time in microseconds and y-axis 2014 of amplitude in volts.

Figure 20C:
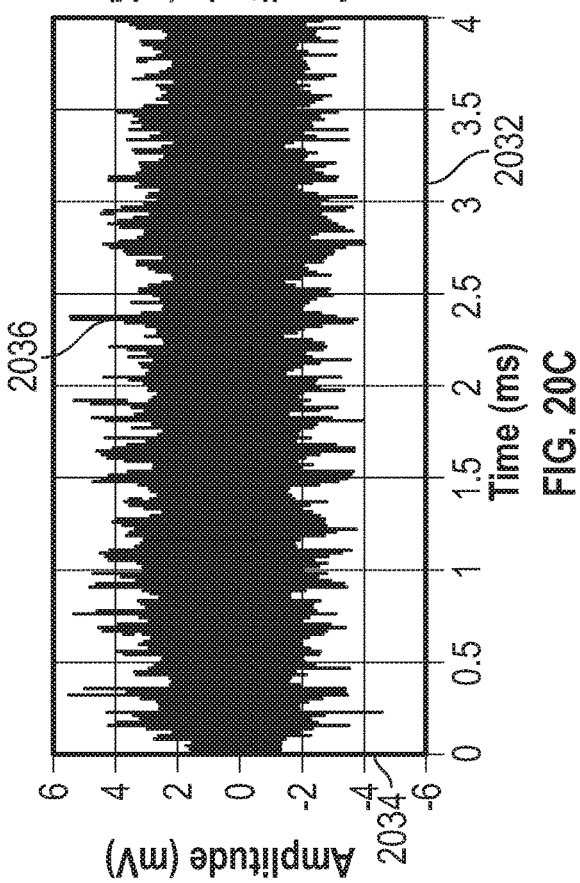

FIG. 20C shows a representation of a recorded channel response to FIG. 20A over 4 ms. The plot 2036 is plotted on x-axis 2032 of time in milliseconds and y-axis 2034 of amplitude in millivolts.

FIG. 20D shows a representation of a recorded channel response to FIG. 20B over 4 ms. The plot 2046 is plotted on x-axis 2042 of time in milliseconds and y-axis 2044 of amplitude in millivolts.

FIG. 20E shows a representation of time-reversed focused signal after retransmission of the time reversed copy of FIG. 20C. The plot 2066 is plotted on x-axis 2052 of time in milliseconds and y-axis 2054 of amplitude in millivolts.

FIG. 20F shows a representation of time-reversed focused signal after retransmission of the time reversed copy of FIG. 20D. The plot 2076 is plotted on x-axis 2062 of time in milliseconds and y-axis 2064 of amplitude in millivolts For both excitation signals, the following was observed: (1) the time-reversal focal signal in FIG. 20E and FIG. 20F is clearly distinguished from the sidelobes; (2) the peak width is very small, thus it is easier to differentiate between different data symbols when the time shift Δt becomes very small; (3) the main lobe occupies a narrow time width compared to frame length; and (4) the amplitude of the side lobes are small compared to the peak amplitude.

For the Gaussian modulated toneburst, the peak of the time-reversed focused signal is sharper than that of the rectangular toneburst. Additionally, its sidelobes have a smaller amplitude than the rectangular toneburst. Nevertheless, the peak of the time-reversed focused rectangular toneburst is larger than that of the Gaussian toneburst.

Therefore, in terms of M-TRPPM modulation for acoustic communication using Lamb waves, the rectangular toneburst is used when communication at low data symbol rates because of its higher peak value in the time-reversed focused signal, while the Gaussian-modulated toneburst is used for higher symbol rates because of its lower sidelobes in the time-reversed focused signal.

Therefore, to summarize, as shown in FIGS. 20A-F, an excitation signal comparison between a rectangular windowed toneburst and a Gaussian modulated toneburst:

FIG. 20A—rectangular toneburst excitation;
FIG. 20B—Gaussian modulated toneburst excitation;
FIG. 20C—recorded channel response to FIG. 20A over 4 ms;
FIG. 20D—recorded channel response to FIG. 20B over 4 ms;
FIG. 20E—time-reversed focused signal after retransmission of the time-reversed copy of FIG. 20C;
FIG. 20F—time-reversed focused signal after retransmission of the time-reversed copy of FIG. 20D.

FIG. 21A shows simulated bit error rate (BER) vs data rate for a 4-cycle toneburst and FIG. 21B shows a Gaussian-modulated toneburst for 100,000 transmitted bits using 2-TRPPM. The signal-to-noise-ratio (SNR) is 20 dB. FIG. 21A shows plot 2120 plotted on x-axis 2102 of data rate in kbps and y-axis 2104 of BER. FIG. 21B shows plot 2130 plotted on x-axis 2112 of data rate in kbps and y-axis 2114 of BER.

In the first phase of M-TRPPM based communication, the intended receiver sends an excitation signal to the intended transmitter. For very dispersive channels, the time-reversed channel response used as the basis signal for M-TRPPM modulation at sensor A is very long compared to the transmitted excitation pulse at sensor B. For binary-TRPPM (2-TRPPM), the time axis is divided into time frames, each frame contains one data symbol, i.e. one data bit 0 or 1. Bit 0 is encoded by transmitting the reference signal at the beginning of the frame and bit 1 is represented by positioning the reference signal at a time shift $\Delta t_1$ after the beginning of the frame.

The length of a TRPPM frame is inversely proportional to the data rate of the communication link. The transmission of the time-reversed channel response from sensor A results in a spatially and temporally focused signal at sensor B whose energy is compressed in a high-peak main lobe forming a pulse-like signal with adjacent sidelobes of lower amplitude. The sidelobes of the focused peak are sources of inter-symbol interference (ISI) to adjacent symbols. The ISI level is the main limitation to the achievable data rate for a given bit error rate (BER) performance.

To examine the performance of 2-TRPPM communication on aluminum plates, the bit error rate (BER) number is empirically computed as follows:

$$BER = \frac{1}{N}\sum_{k=0}^{N-1} \varepsilon(a_k) \tag{32}$$

where N is the number of transmitted symbols and $\varepsilon(a_k)$ is the bit error function $$\varepsilon(a_k) = \begin{cases} 1, & \hat{a}_k \neq a_k \\ 0, & \hat{a}_k = a_k \end{cases} \tag{33}$$

where $a_k$ is the $k^{th}$ transmitted symbol and $\hat{a}_k$ is the $k^{th}$ detected symbol, k=1 . . . N. The bit error rate is a good indicator of the communication channel performance because it determines if the receiver is able to accurately recover the transmitted information bits in the presence of the ambient noise and interference, or bit synchronization errors. A lower BER value at a given signal-to-noise ratio indicates higher accuracy of a specific communication scheme. The following is an examination of the value of the simulated BER of the 2-TRPPM modulation scheme at different data transmission rate for a fixed signal-to-noise ratio (SNR) of 20 dB.

An examination was made of the possible data rates for a target error rate such that BER<$10^{-3}$. To do so, a calculation was made of the bit error rate over 100,000 transmitted bits for bit rate that ranges between 1 kbps and 14 kbps as depicted in FIG. 21A.

A comparison of the results for the two different types of excitation signals was made. The rectangular toneburst and the Gaussian modulated toneburst achieves comparable BER performance at low data rates. However, at higher data rates, the Gaussian modulated excitation signal achieves better BER results. FIG. 21A shows that very good error rate of BER<$10^{-5}$ can be achieved at low data rates. However, the information bits transmitted at lower data rates takes longer to reach the receiver.

Figure 22A:
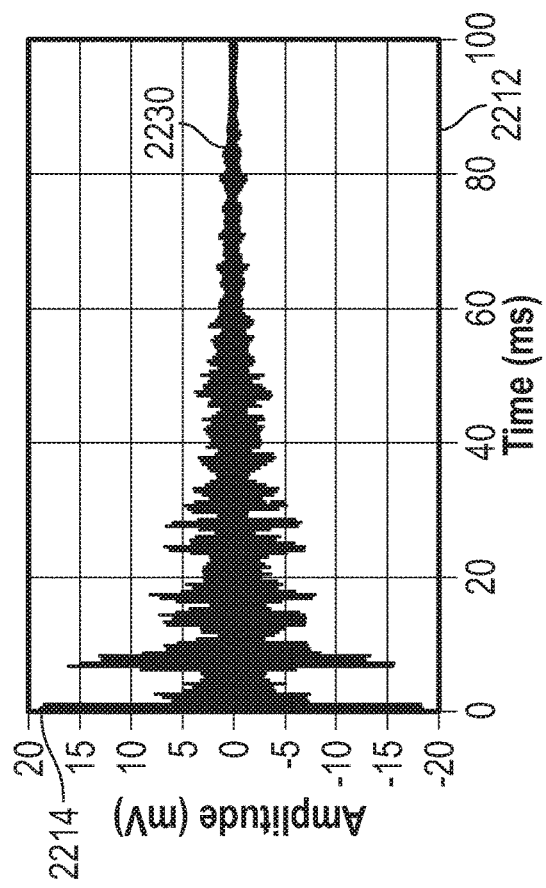
FIGS. 22A and 22B show channel response of an airplane elevator specimen to a 4-cycle toneburst excitation signal at 300 KHz.
Figure 22B:
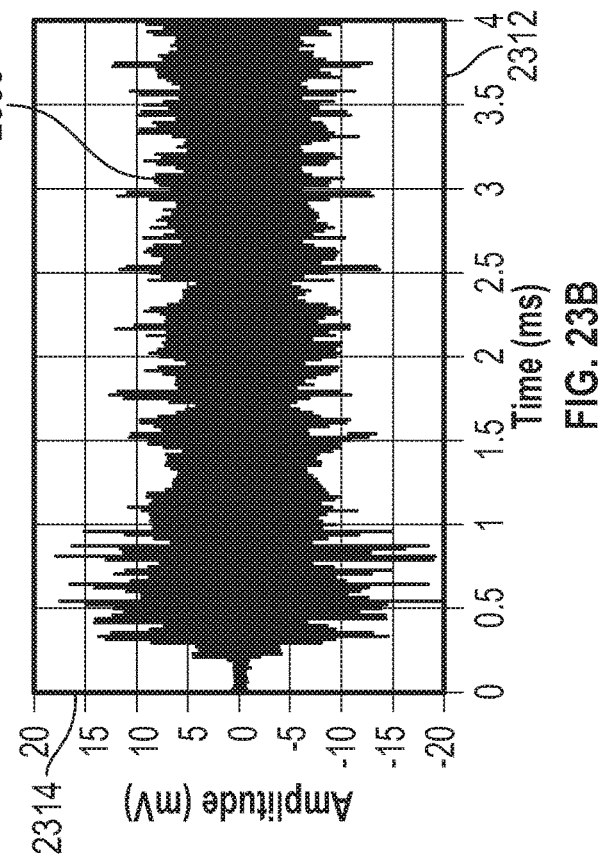

FIGS. 22A and 22B show channel response of an airplane elevator specimen to a 4-cycle toneburst excitation signal at 300 KHz. FIG. 22A shows a 4 cycle toneburst excitation and FIG. 22B shows the channel response recorded over 1 ms. This response is recorded between two PZT sensors 60 inches apart.

FIG. 22A shows plot 2220 plotted on x-axis 2202 of time in microseconds and y-axis 2204 of amplitude in volts. FIG. 22B shows plot 2230 plotted on x-axis 2212 of time in milliseconds and y-axis 2214 of amplitude in millivolts.

Figure 23A:
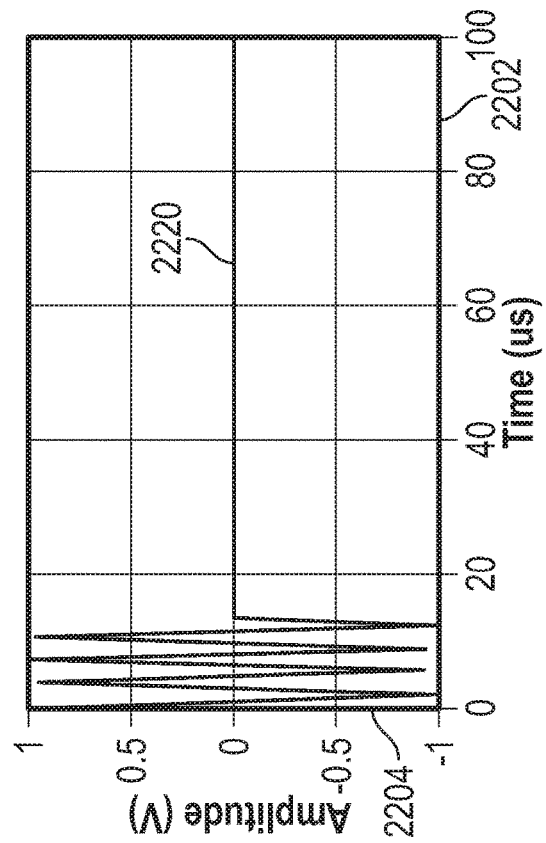
FIGS. 23A and 23B show channel response to a 4-cycle toneburst excitation signal on isotropic structures.
Figure 23B:
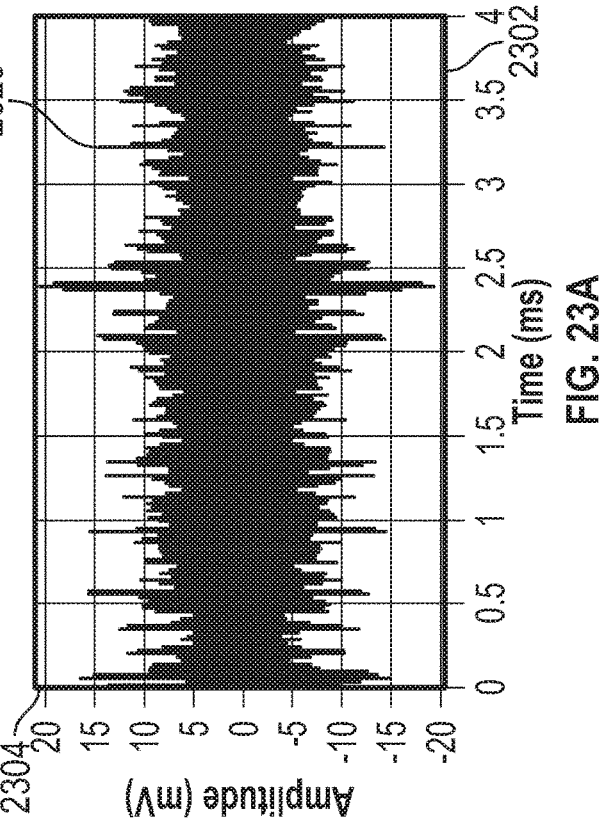

FIGS. 23A and 23B show channel response to a 4-cycle toneburst excitation signal on isotropic structures. FIG. 23A shows the channel response on the aluminum plate specimen without damage. FIG. 23B shows the channel response on the aluminum bar specimen with an artificial hole drilled in it.

FIG. 23A shows plot 2320 plotted on x-axis 2302 of time in milliseconds and y-axis 2304 of amplitude in millivolts. FIG. 23B shows plot 2330 plotted on x-axis 2312 of time in milliseconds and y-axis 2314 of amplitude in millivolts.

The dispersive and multimodal properties of the elastic channel are materialized by the spreading of the excitation energy in space and time.

FIG. 22A shows the excitation signal used to probe the different structures under test. The recorded channel response on the airplane elevator specimen, the plate specimen, and the bar specimen are presented in FIGS. 22B, 23A, and 23B, respectively. Because the elevator specimen has a very small thickness of approximately 0.0625 inch, it is subject to less dispersion and multimodal propagation effects. Therefore, the channel response is recorded over 1 ms on the elevator specimen as compared to the other two specimens whose channel responses are recorded over 4 ms.

However, because screws and holes are present on the airplane elevator and because of its tapered structure, this channel response is more discontinuous than that of the other two specimens. Moreover, the bar specimen with a hole on its structure also presents less continuity than the plate specimen because the hole is a source of the propagating waves diffraction in addition to the waves reflections on the structure boundaries.

FIGS. 24A and 24B show 2-TRPPM modulated data exchange at 1 kbps between 2 sensors mounted on the aluminum plate specimen. FIG. 24A shows zoom-in on the transmitted signal. FIG. 24B shows zoom-in on the received signal. FIG. 24A shows plot 2420 plotted on x-axis 2402 of time in milliseconds and y-axis 2404 of amplitude in volts. FIG. 24B shows plot 2430 plotted on x-axis 2412 of time in milliseconds and y-axis 2414 of amplitude in volts.

FIGS. 25A and 25B show 2-TRPPM modulated data exchange at 10 kbps between 2 sensors mounted on the airplane elevator. FIG. 25A shows zoom-in on the transmitted signal. FIG. 25B shows zoom-in on the received signal. FIG. 25A shows plot 2520 plotted on x-axis 2502 of time in milliseconds and y-axis 2504 of amplitude in volts. FIG. 25B shows plot 2530 plotted on x-axis 2512 of time in milliseconds and y-axis 2514 of amplitude in volts.

Figure 26A:
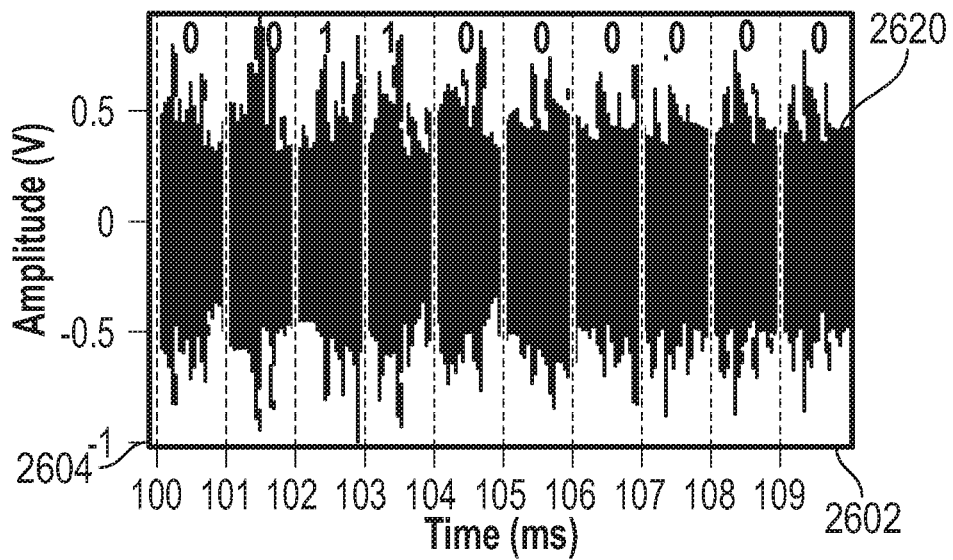
FIGS. 26A and 26B show a TR-PPM modulated data exchange at 1 kbps on an aluminum bar.
Figure 26B:
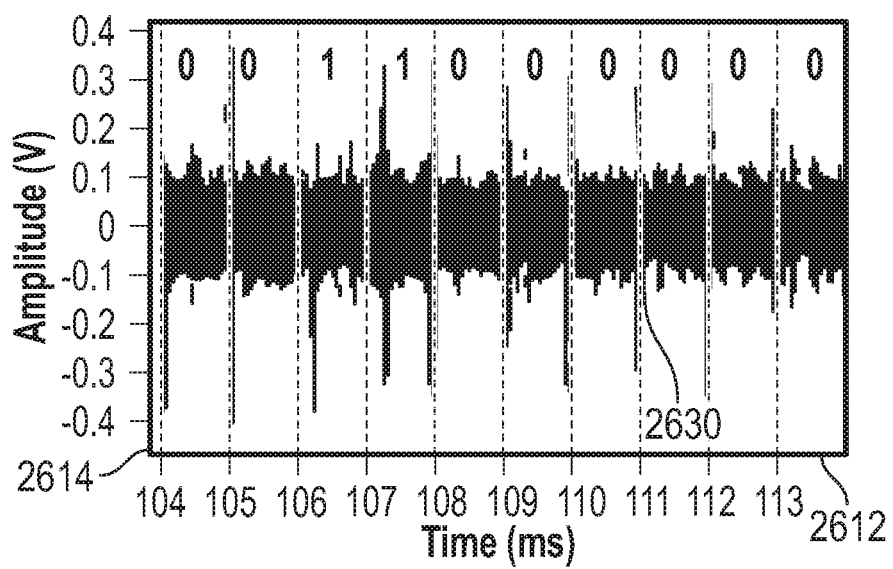

FIGS. 26A and 26B show 2-TRPPM modulated data exchange at 1 kbps on an aluminum bar in presence of a hole drilled on the bar. FIG. 26A shows zoom-in on the transmitted signal. FIG. 26B shows zoom-in on the received signal. FIG. 26A shows plot 2620 plotted on x-axis 2602 of time in milliseconds and y-axis 2604 of amplitude in volts. FIG. 26B shows plot 2630 plotted on x-axis 2612 of time in milliseconds and y-axis 2614 of amplitude in volts.

FIGS. 24A and 24B, 25A and 25B, and 26A and 26B show the binary-TRPPM modulated data exchange between two sensors A and B mounted on each of the three experimental plate specimens. On all three specimens under test, the data exchange at 1 kbps and 10 kbps between sensors A and B is performed without errors for 1000 transmitted bits in a single communication session.

FIGS. 27A-27D show recorded channel response to an excitation signal broadcasted from sensor A on the aluminum plate specimen without damage. FIG. 27A shows pilot signal 2720 of sensor A (receiver sensor) plotted on x-axis 2702 of time in microseconds and y-axis 2704 of amplitude in volts. FIG. 27B shows pilot signal 2730 of sensor A (receiver sensor) plotted on x-axis 2712 of time in microseconds and y-axis 2714 of amplitude in volts. FIG. 27C shows plot 2740 of time-reversed receiver pilot from sensor A plotted on x-axis 2722 of time in milliseconds and y-axis 2724 of amplitude in millivolts. FIG. 27D shows plot 2750 of time-reversed receiver pilot from sensor A plotted on x-axis 2732 of time in milliseconds and y-axis 2734 of amplitude in millivolts.

FIGS. 28A-28D show received data signals at sensor A from sensors B and C on the aluminum plate specimen. FIG. 28A shows transmitted PPM signal 2820 of sensor B (transmitting sensor) plotted on x-axis 2802 of time in milliseconds and y-axis 2804 of amplitude in volts. FIG. 28B shows transmitted PPM signal 2830 of sensor C plotted on x-axis 2812 of time in milliseconds and y-axis 2814 of amplitude in volts. FIG. 28C shows receiver PPM signal plot 2840 from sensor B plotted on x-axis 2822 of time in milliseconds and y-axis 2824 of amplitude in volts. FIG. 28D shows receiver PPM signal plot 2850 from sensor C plotted on x-axis 2832 of time in milliseconds and y-axis 2834 of amplitude in volts.

FIGS. 29A-29D show recorded channel responses to an excitation signal broadcast from a sensor that is disposed on the airplane elevator part specimen. FIG. 29A shows an excitation signal 2920 from sensor A (receiver sensor) plotted on x-axis 2902 of time in microseconds and y-axis 2904 of amplitude in volts. FIG. 29B shows an excitation signal 2930 of sensor A (receiver sensor) plotted on x-axis 2912 of time in microseconds and y-axis 2914 of amplitude in volts. FIG. 29C shows a plot 2940 of time-reversed excitation signal from sensor A plotted on x-axis 2922 of time in milliseconds and y-axis 2924 of amplitude in millivolts. FIG. 29D shows plot 2950 of time-reversed excitation signal plotted on x-axis 2932 of time in milliseconds and y-axis 2934 of amplitude in millivolts.

Figure 30A:
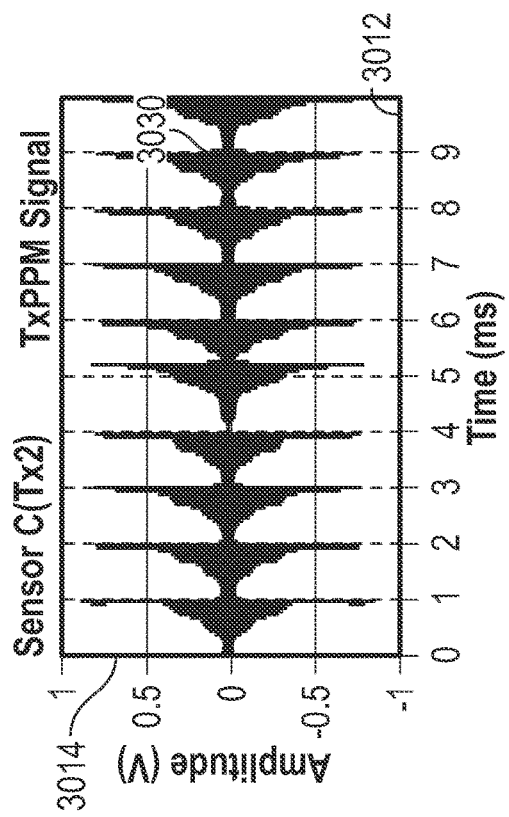
FIGS. 30A-30D show a representation of received data signals at a first sensor from a plurality of other sensors.
Figure 30B:
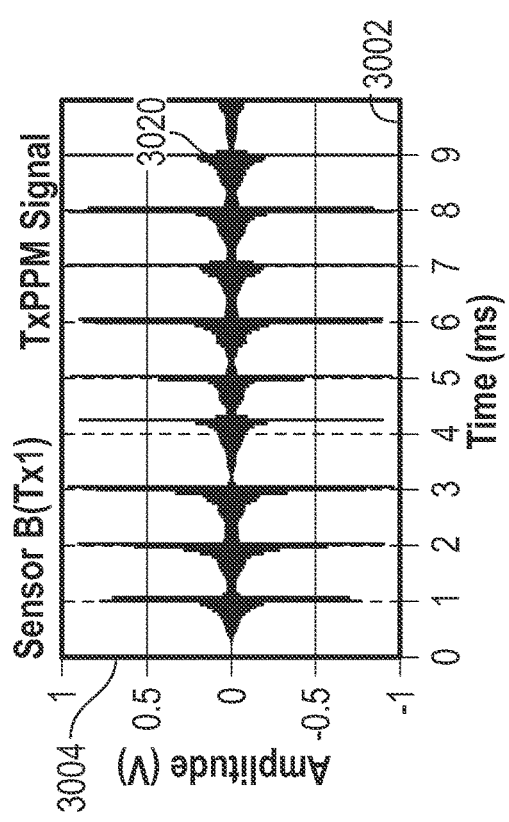
Figure 30C:
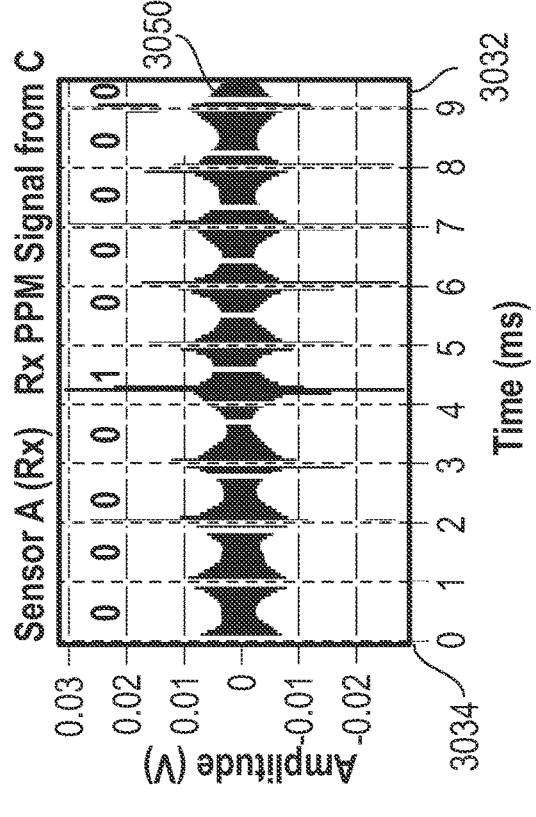
Figure 30D:
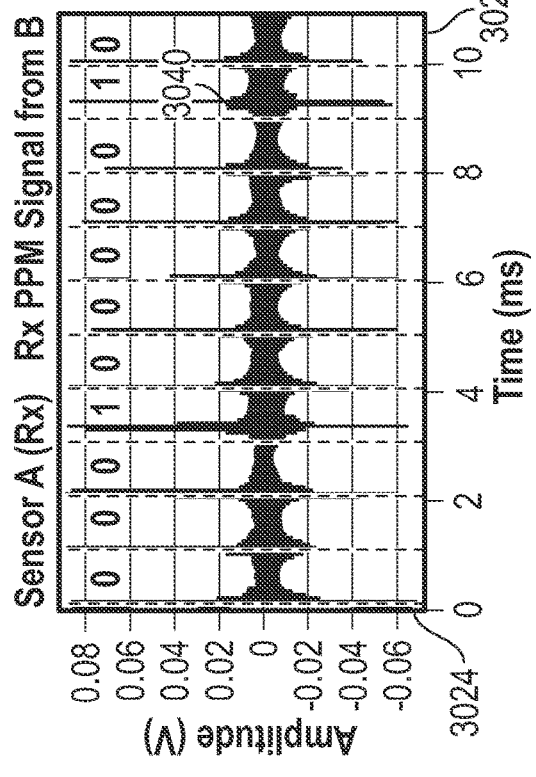

FIGS. 30A-30D show a representation of received data signals at a first sensor (A) from a plurality of other sensors (B, C) on the airplane elevator part specimen. FIG. 30A shows transmitted PPM signal 3020 of sensor B plotted on x-axis 3002 of time in milliseconds and y-axis 3004 of amplitude in volts. FIG. 30B shows pilot signal 3030 of sensor C (transmitted PPM signal) plotted on x-axis 3012 of time in milliseconds and y-axis 3014 of amplitude in volts. FIG. 20C shows plot 3040 of receiver PPM signal from sensor B plotted on x-axis 3022 of time in milliseconds and y-axis 3024 of amplitude in volts. FIG. 30D shows plot 3050 of receiver PPM signal from sensor C plotted on x-axis 3032 of time in milliseconds and y-axis 3034 of amplitude in volts.

As stated above, FIG. 27 and FIG. 28 show results of wireless data exchange between multiple sensors that was experimentally evaluated for the aluminum plate specimen without damage.

FIG. 29 and FIG. 30 are directed to the airplane elevator part specimen with a tapered-plate structure. First, the excitation signal is broadcasted from the sink node A of the wireless sensor network to the sensor nodes B and C. Then, the channel responses to the excitation signal are recorded at each sensor node within the network. Finally, the damage data information is transmitted from the sensor nodes B and C to the sink node A.

Figure 31:
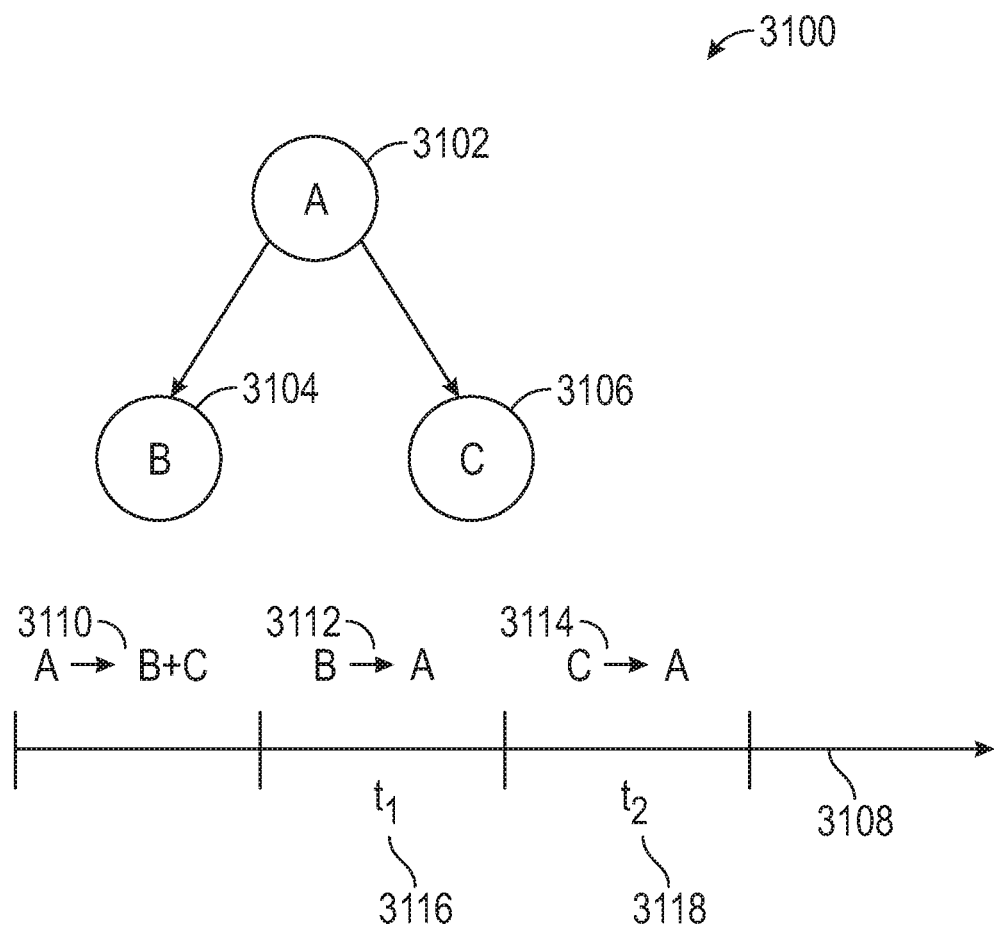
FIG. 31 shows an upstream communication between sensors.

FIG. 31 shows system 3100 for upstream communication that includes sensor A 3102, sensor B 3104 and sensor C 3106. A time line 3108 is shown with segments 3110, 3112 and 3114.

Sensor A 3102 communicates with sensor B 3104 and sensor A 3102 communicates with sensor C 3106. As shown on time line 3108, sensor A communicates with sensor B 3104 and sensor C 3106 during time frame 3110. Sensor B 3104 responds to sensor A 3102 during time frame 3112. Sensor C 3106 responds to sensor A 3102 during time frame 3114. Time frame 3112 is indicated as $t_1$ 3116, $t_1$ having been described herein. Time frame 3114 is indicated as $t_2$ 3118, $t_2$ having been described herein.

This disclosure provides a detailed description of a wireless sensor network based on M-ary time-reversal pulse position modulation (M-TRPPM) for data transmission using elastic waves, or Lamb waves, across structures, such as aerostructures, whose shapes are modeled as plate-like structures. The presented communication system overcomes the challenges of elastic-wave propagation on solid media, namely the extremely dispersive and multimodal characteristics of the elastic channel. The proposed acoustic wireless network supports time-reversal sensor-to-sensor and multi-sensor communication within the established sensor network.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present embodiments are described herein with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer, or other programmable apparatus to produce a computer-implemented process such that the instructions which execute on the computer or other programmable apparatus, provide processes for implementing the functions/acts specified in the flowchart and/or block diagram block or blocks.

Various embodiments are described herein and include apparatus and methods.

One embodiment is directed to an apparatus ("the apparatus") comprising: one or more sensors adapted to obtain sensed data of a structure, where the one or more sensors are integral to the structure; a controller adapted to receive sensed data from at least one of the one or more sensors via a structural channel of the structure; and where the structural channel provides a structural medium for the propagation of elastic waves according to an M-ary time-reversal pulse position modulation protocol in a physical layer.

Another embodiment is directed to the apparatus as described above, where the structural channel is a planar structural channel.

Another embodiment is directed to the apparatus as described above, and further comprising a second protocol comprises a time-reversal based sensor-to-sensor communication protocol in either a MAC layer or the physical layer.

Another embodiment is directed to the apparatus as described above, further comprising a time-reversal time division multiple access protocol in a MAC layer.

Another embodiment is directed to the apparatus as described above, further comprising two or more sensors adapted to obtain sensed data of a structure, where the two or more sensors are integral to the structure.

Another embodiment is directed to the apparatus as described above, where the controller is adapted to obtain sensed data.

Another embodiment is directed to the apparatus as described above, where the controller is adapted to transmit the sensed data obtained by the controller.

Another embodiment is directed to the apparatus as described above, where the sensed data has a frame format where:
  a preamble is added at a beginning of the frame for synchronization;
  a frame header contains an address of a source sensor node and an address of a destination sensor node for verification purposes at a receiving sensor node; and
  a data payload includes information.

Another embodiment is directed to the apparatus as described above, where the structure is a portion of an aero-structure.

Another embodiment is directed to the apparatus as described above, where the protocol is compatible with a modulation technique.

Another embodiment is directed to an apparatus comprising:
  two or more sensor nodes adapted to obtain sensed data from a structure, where the sensor nodes are integral to the structure;
  a controller adapted to receive sensed data from the sensor nodes, via a network formed by the sensor nodes and the controller,
  where the controller controls:
  functionality of each of the sensor nodes;
  time synchronization among the sensor nodes;
  detecting information collected by the sensor nodes; and
  communicating, utilizing an M-ary time-reversal pulse position modulation protocol, the detected information using a planar surface of the structure as the transmission medium for elastic waves.

Another embodiment is directed to the apparatus, where the communication comprises one or more of: a control data exchange from the controller to the sensor nodes; and indication data exchanged from the sensor nodes to the controller.

Another embodiment is directed to the apparatus, where the planar surface of the structure provides a channel, the channel being probed from the sensor nodes to the controller where:
  (1) all sensor node clocks are at "0" after startup or reset and are initialized at the same time $t_{init}$; (2) each sensor node is assigned a sensor number from 1 to N; (3) when initially deploying the sensor nodes on the structure, the maximum propagation delay $t_{pd_{max}}$ is measured between the farthest sensor node and the controller and programmed into each sensor node; (4) before sending a probing signal to the controller from the sensor node, each sensor node observes a backoff time $t_{bck_n}$ that equals its sensor number multiplied by the maximum propagation delay: $t_{bck_n} = n^* t_{pd_{max}}$.

Another embodiment is directed to the apparatus, where the controller receives N probing signals from the N sensor nodes.

Another embodiment is directed to a method comprising:
  identifying an incoming signal containing information of a structure, from a plurality of sensor nodes integral to the structure;
  utilizing a portion of the structure as a channel;
  making a determination related to channel probing; and
  responsive to the determination:
  utilizing an M-ary time-reversal pulse position modulation to propagate elastic waves through the structural channel of the structure, the elastic waves including at least a portion of the information of the incoming signal.

Another embodiment is directed to the method further comprising: utilizing packet demodulation based on the determination of no channel probing.

Another embodiment is directed to the method further comprising: partitioning detection information and time-reversal data communication phases for the sensor nodes.

Another embodiment is directed to the method where the channel is probed from the sensor nodes:
  (1) all sensor node clocks are at "0" after startup or reset and are initialized at the same time $t_{init}$; (2) each sensor node is assigned a sensor number from 1 to N; (3) when initially deploying the sensor nodes on the structure, the maximum propagation delay $t_{pd_{max}}$ is measured between the farthest sensor node and a controller and programmed into each sensor node; (4) before sending a probing signal from the sensor node to the controller, each sensor node observes a backoff time $t_{bck_n}$ that equals its sensor node number multiplied by the maximum propagation delay: $t_{bck_n} = n^* t_{pd_{max}}$.

Another embodiment is directed to the method, where the controller receives N probing signals from the N sensor nodes.

As will be appreciated by one skilled in the art, the disclosure may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

While the present disclosure has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The disclosure in its broader aspects is therefore not limited to the specific details, representative apparatus and method, and illustrative examples shown and described. Accordingly, departures may be made from such details without departing from the scope of the general disclosed concepts.

Some of the illustrative aspects of the present disclosure may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings without departing from the essential scope thereof.

Therefore, it is intended that the disclosure not be limited to the particular embodiment disclosed as the best or only mode contemplated for carrying out this disclosure, but that the disclosure will include all embodiments falling within the scope of the appended claims. Also, in the drawings and the description, there have been disclosed exemplary embodiments and, although specific terms may have been employed, they are unless otherwise stated used in a generic and descriptive sense only and not for purposes of limitation, the scope of the disclosure therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the disclosure should be determined by the appended claims and their legal equivalents, and not by the examples given.

The invention claimed is:

1. An apparatus comprising:
one or more N sensor nodes adapted to obtain sensed data of a structure, where the one or more N sensor nodes are integral to the structure and each sensor node is assigned a sensor node number n from 1 to N; and
a controller adapted to receive sensed data from at least one of the one or more N sensor nodes via a structural channel of the structure,
where a maximum propagation delay $t_{pd_{max}}$ is measured between a farthest sensor node and the controller and programmed into each sensor node, each sensor node of the one or more N sensor nodes observes a backoff time $t_{bck_n} = n*t_{pd_{max}}$ equal to its sensor node number n multiplied by the maximum propagation delay $t_{pd_{max}}$ prior to transmission of a probing signal, and the structural channel provides a structural medium for the propagation of elastic waves according to an M-ary time-reversal pulse position modulation protocol in a physical layer.

2. The apparatus as claimed in claim 1, where the structural channel is a planar structural channel.

3. The apparatus as claimed in claim 1, further comprising a second protocol that includes a time-reversal based sensor-to-sensor communication protocol in either a MAC layer or the physical layer.

4. The apparatus as claimed in claim 1, further comprising a time-reversal time division multiple access protocol in a MAC layer.

5. The apparatus as claimed in claim 1, further comprising:
two or more sensor nodes adapted to obtain sensed data of a structure, where the two or more sensor nodes are integral to the structure.

6. The apparatus as claimed in claim 5, where the controller is adapted to obtain sensed data.

7. The apparatus as claimed in claim 5, where the controller is adapted to transmit the sensed data obtained by the controller.

8. The apparatus as claimed in claim 5, where the sensed data has a frame where:
a preamble is added at a beginning of the frame for synchronization;
a frame header contains an address of a source sensor node and an address of a destination sensor node for verification purposes at a receiving sensor node; and
a data payload includes information.

9. The apparatus as claimed in claim 1, where the structure is a portion of an aero-structure.

10. The apparatus as claimed in claim 1, where the protocol is compatible with a modulation technique.

11. An apparatus comprising:
two or more sensor nodes adapted to obtain sensed data from a structure, where the sensor nodes are integral to the structure and each sensor node is assigned a sensor node number;
a controller adapted to receive sensed data from the sensor nodes via a network formed by the sensor nodes and the controller, where the controller controls:
functionality of each of the sensor nodes;
time synchronization among the sensor nodes;
detecting information collected by the sensor nodes; and
communicating, utilizing an M-ary time-reversal pulse position modulation protocol, the detected information using a planar surface of the structure as the transmission medium for elastic waves, and
where a maximum propagation delay is measured between a farthest sensor node and the controller and programmed into each sensor node, and
where each sensor node of the sensor nodes observes a backoff time equal to its sensor node number multiplied by the maximum propagation delay prior to transmission of a probing signal.

12. The apparatus as claimed in claim 11, where the communication comprises one or more of:
a control data exchange from the controller to the sensor nodes; and
indication data exchanged from the sensor nodes to the controller.

13. The apparatus as claimed in claim 11, where the planar surface of the structure provides a channel, the channel being probed from the sensor nodes to the controller where:
all sensor node clocks are at "0" after startup or reset and are initialized at the same time $t_{1_{nit}}$; and when initially deploying the sensor nodes on the structure, the maximum propagation delay $t_{pd_{max}}$ is measured between the farthest sensor node and the controller.

14. The apparatus as claimed in claim 11, where the controller receives N probing signals from the sensor nodes.

15. A method comprising:
    identifying an incoming signal containing information of a structure, from at least one of a plurality of N sensor nodes integral to the structure;
    assigning each sensor node of the plurality of N sensor nodes a sensor number from 1 to N;
    utilizing a portion of the structure as a structural channel;
    when initially deploying the sensor nodes on the structure, measuring a maximum propagation delay $t_{pd_{max}}$ between the farthest sensor node and a controller and programming the maximum propagation delay $t_{pd_{max}}$ into each sensor node of the plurality of N sensor nodes;
    before sending a probing signal to a controller, each sensor node of the plurality of N sensor nodes observing a backoff time equal to its sensor number multiplied by the maximum propagation delay;
    making a determination related to channel probing; and
    responsive to the determination utilizing an M-ary time-reversal pulse position modulation to propagate elastic waves through the structural channel of the structure, the elastic waves including at least a portion of the information of the incoming signal.

16. The method as claimed in claim 15, further comprising:
    utilizing packet demodulation based on the determination of no channel probing.

17. The method as claimed in claim 15, further comprising:
    partitioning detection information and time-reversal data communication phases for the sensor nodes.

18. The method as claimed in claim 15, where the channel is probed from the sensor nodes:
    sensor node clocks are at "0" after startup or reset and are initialized at the same time $t_{init}$; and
    when initially deploying the sensor nodes on the structure, the maximum propagation delay $t_{pd_{max}}$ is measured between the farthest sensor node and the controller and programmed into each sensor node.

19. The method as claimed in claim 15, where the controller receives N probing signals from the N sensor nodes.

20. The apparatus as claimed in claim 1, the structural channel being probed from the one or more N sensor nodes to the controller where:
    all sensor node clocks are at "0" after startup or reset and are initialized at the same time $t_{init}$; and
    when initially deploying the sensor nodes on the structure, the maximum propagation delay $t_{pd_{max}}$ is measured between the farthest sensor node and the controller.

* * * * *